United States Patent
Lee et al.

(10) Patent No.: US 11,227,594 B2
(45) Date of Patent: Jan. 18, 2022

(54) METHOD AND DEVICE FOR PROVIDING RESPONSE TO VOICE INPUT OF USER

(71) Applicant: Samsung Electronics Co., Ltd., Suwon-si (KR)

(72) Inventors: Jong-ryul Lee, Seoul (KR); Young-chul Sohn, Seoul (KR); Gyu-tae Park, Seoul (KR); Ki-beom Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 16/489,485

(22) PCT Filed: Mar. 9, 2018

(86) PCT No.: PCT/KR2018/002847
§ 371 (c)(1),
(2) Date: Aug. 28, 2019

(87) PCT Pub. No.: WO2018/182201
PCT Pub. Date: Oct. 4, 2018

(65) Prior Publication Data
US 2020/0066270 A1 Feb. 27, 2020

(30) Foreign Application Priority Data
Mar. 28, 2017 (KR) .................. 10-2017-0039303

(51) Int. Cl.
*G10L 15/22* (2006.01)
*G06N 20/00* (2019.01)
(Continued)

(52) U.S. Cl.
CPC .............. *G10L 15/22* (2013.01); *G06F 40/20* (2020.01); *G06N 20/00* (2019.01); *G10L 15/005* (2013.01);
(Continued)

(58) Field of Classification Search
CPC ... G10L 15/22; G10L 15/005; G10L 15/1815; G10L 15/24; G10L 25/60;
(Continued)

(56) References Cited

U.S. PATENT DOCUMENTS 7,643,985 B2 1/2010 Horvitz
8,202,094 B2 6/2012 Spector
(Continued)

FOREIGN PATENT DOCUMENTS

KR 10-2006-0043333 A 5/2006
KR 10-2010-0094182 A 8/2010
(Continued)

OTHER PUBLICATIONS

Wu et al.; "Visual Question Answering: A Survey of Methods and Datasets"; School of Computer Science, The University of Adelaide, SA 5005, Australia; Jul. 21, 2016; arXiv:1607.05910v1 [cs.CV].
(Continued)

*Primary Examiner* — Thuykhanh Le
(74) *Attorney, Agent, or Firm* — Jefferson IP Law, LLP

(57) ABSTRACT

A method, performed by a device, of providing a response to a user's voice input, includes capturing, via a camera of the device, an image including at least one object; activating a microphone of the device as the image is captured; receiving, via the microphone, the user's voice input for the object; determining the intention of the user with respect to the object by analyzing the received voice input; and providing a response regarding the at least one object based on the determined intention of the user.

17 Claims, 14 Drawing Sheets

(51) Int. Cl.
  *G10L 15/00*       (2013.01)
  *G10L 15/18*       (2013.01)
  *G10L 15/24*       (2013.01)
  *G10L 25/60*       (2013.01)
  *G06F 40/20*       (2020.01)

(52) U.S. Cl.
  CPC .......... *G10L 15/1815* (2013.01); *G10L 15/24* (2013.01); *G10L 25/60* (2013.01); *G10L 2015/223* (2013.01)

(58) Field of Classification Search
  CPC .......... G10L 2015/223; G10L 15/1822; G10L 2015/225; G10L 25/63; G10L 15/26; G06N 20/00; G06N 3/084; G06N 3/0445; G06F 40/263; G06F 16/00; G06F 3/16; G06F 3/00; G06F 40/20; G06F 16/903; G06F 3/005; G06F 3/167
  USPC ....................................................... 704/235
  See application file for complete search history.

(56) References Cited

U.S. PATENT DOCUMENTS

| | | | |
|---|---|---|---|
| 8,230,032 B2 | 7/2012 | Pearson et al. | |
| 8,275,803 B2 | 9/2012 | Brown et al. | |
| 8,805,756 B2 | 8/2014 | Boss et al. | |
| 9,401,149 B2* | 7/2016 | Bae | H03G 3/02 |
| 9,514,512 B2* | 12/2016 | Jin | G06T 3/0012 |
| 9,538,148 B2 | 1/2017 | Park | |
| 9,619,200 B2* | 4/2017 | Chakladar | G06F 3/167 |
| 2003/0033266 A1* | 2/2003 | Schott | G06N 5/043 |
| | | | 706/45 |
| 2007/0203863 A1 | 8/2007 | Gupta et al. | |
| 2011/0191239 A1* | 8/2011 | Blackhurst | G06Q 30/0255 |
| | | | 705/39 |
| 2012/0083182 A1 | 4/2012 | Heatherly et al. | |
| 2013/0147826 A1* | 6/2013 | Lamb | G06F 3/011 |
| | | | 345/589 |
| 2013/0238336 A1* | 9/2013 | Sung | G10L 15/005 |
| | | | 704/255 |
| 2013/0262125 A1* | 10/2013 | Tunstall-Pedoe | G06F 16/3329 |
| | | | 704/270.1 |
| 2013/0282360 A1* | 10/2013 | Shimota | G06F 40/58 |
| | | | 704/7 |
| 2013/0346068 A1* | 12/2013 | Solem | G10L 15/26 |
| | | | 704/9 |
| 2014/0081633 A1* | 3/2014 | Badaskar | G06F 16/438 |
| | | | 704/235 |
| 2014/0142928 A1* | 5/2014 | Campbell | G10H 1/02 |
| | | | 704/201 |
| 2014/0142940 A1* | 5/2014 | Ziv | G10L 17/02 |
| | | | 704/235 |
| 2014/0142953 A1* | 5/2014 | Kim | G10L 15/22 |
| | | | 704/275 |
| 2014/0172879 A1 | 6/2014 | Dubbels et al. | |
| 2014/0188478 A1* | 7/2014 | Zhang | G10L 15/22 |
| | | | 704/257 |
| 2015/0074112 A1 | 3/2015 | Liu et al. | |
| 2015/0106205 A1* | 4/2015 | Rose | G06Q 30/0269 |
| | | | 705/14.58 |
| 2015/0153571 A1* | 6/2015 | Ballard | H04L 12/1822 |
| | | | 345/8 |
| 2015/0170257 A1* | 6/2015 | Pettyjohn | H04M 3/4936 |
| | | | 704/235 |
| 2015/0227519 A1 | 8/2015 | Clark et al. | |
| 2015/0269420 A1* | 9/2015 | Kim | G06F 21/32 |
| | | | 382/118 |
| 2015/0293903 A1* | 10/2015 | Baron | G06F 40/253 |
| | | | 704/9 |
| 2015/0370787 A1* | 12/2015 | Akbacak | G06F 40/47 |
| | | | 704/2 |
| 2016/0026867 A1* | 1/2016 | Wexler | G06F 16/51 |
| | | | 382/103 |
| 2016/0098138 A1* | 4/2016 | Park | G06F 1/1686 |
| | | | 345/173 |
| 2016/0104511 A1* | 4/2016 | An | G10L 15/08 |
| | | | 386/241 |
| 2016/0110422 A1* | 4/2016 | Roytman | G06N 5/00 |
| | | | 706/12 |
| 2016/0124937 A1* | 5/2016 | Elhaddad | G06F 40/205 |
| | | | 704/9 |
| 2016/0180833 A1* | 6/2016 | Tanaka | G10L 13/0335 |
| | | | 704/260 |
| 2016/0182860 A1* | 6/2016 | Yu | H04N 5/23203 |
| | | | 348/135 |
| 2016/0210872 A1* | 7/2016 | Roberts | G09B 19/04 |
| 2016/0260353 A1* | 9/2016 | Dhawan | G09B 21/001 |
| 2017/0011211 A1* | 1/2017 | Lo | G06K 9/00288 |
| 2017/0041523 A1* | 2/2017 | Rifkin | H04N 5/23203 |
| 2017/0052939 A1* | 2/2017 | Seol | G06K 9/344 |
| 2017/0068423 A1* | 3/2017 | Napolitano | G06F 16/489 |
| 2017/0132204 A1* | 5/2017 | Bolshinsky | G06F 16/337 |
| 2017/0163866 A1* | 6/2017 | Johnson | G06F 3/011 |
| 2017/0235768 A1* | 8/2017 | Amrutkar | G06F 3/04842 |
| | | | 707/722 |
| 2017/0278305 A1* | 9/2017 | Sisbot | G06T 19/006 |
| 2017/0282373 A1* | 10/2017 | Kondo | B25J 9/1697 |
| 2017/0324926 A1* | 11/2017 | Takimoto | G06F 3/16 |
| 2017/0339340 A1* | 11/2017 | De Bayser | H04N 5/23216 |
| 2018/0018959 A1* | 1/2018 | Des Jardins | G10L 15/32 |
| 2018/0101154 A1* | 4/2018 | Nomoto | H04L 12/2816 |
| 2018/0107685 A1* | 4/2018 | Kale | G06F 16/51 |
| 2018/0211650 A1* | 7/2018 | Knudson | G10L 15/183 |
| 2018/0315085 A1* | 11/2018 | Ono | G06Q 30/0257 |
| 2019/0116260 A1* | 4/2019 | Ma | G10L 15/22 |
| 2020/0004845 A1* | 1/2020 | Filip | G06T 7/0022 |

FOREIGN PATENT DOCUMENTS

KR   10-2012-0132179 A   5/2012
KR   10-2016-0072639 A   6/2016

OTHER PUBLICATIONS

International Search Report dated Jun. 25, 2018; Application #: PCT/KR2018/002847.
Korean Office Action with English translation dated Nov. 30, 2020; Korean Appln No. 10-2017-0039303.

* cited by examiner

METHOD AND DEVICE FOR PROVIDING RESPONSE TO VOICE INPUT OF USER

TECHNICAL FIELD

The present disclosure relates to a method and apparatus for providing a response to a user's voice input.

BACKGROUND ART

Recently, large amounts of data have continuously accumulated, performance of related hardware such as a central processing unit (CPU) has improved, and algorithms capable of self-learning such as deep learning have been developed. Accordingly, interest in electronic devices using machine learning and artificial neural networks is increasing.

Machine learning and artificial neural network technologies, which allow the recognition rate of big data to be increased stochastically through self-learning, enable electronic devices to make rational decisions, similarly to people.

Deep learning may be used in a method of providing a response to a user's voice input by using a device, and thus, a deep learning technology capable of effectively responding to a user's intention is desired.

DESCRIPTION OF EMBODIMENTS

Technical Problem

Provided are a method and apparatus for providing a response to a user's voice input. A technical problem to be solved by the present embodiment is not limited to the above-mentioned technical problem, and other technical problems may be deduced from the following embodiments.

Solution to Problem

According to an aspect of the present disclosure, a method of providing a response to a user's voice input, performed by a device, includes capturing, via a camera of the device, an image including at least one object; activating a microphone of the device as the image is captured; receiving, via the microphone, the user's voice input for the at least one object; determining an intention of the user with respect to the at least one object by analyzing the received voice input; and providing a response regarding the at least one object based on the determined intention of the user.

BEST MODE

Figure 1:
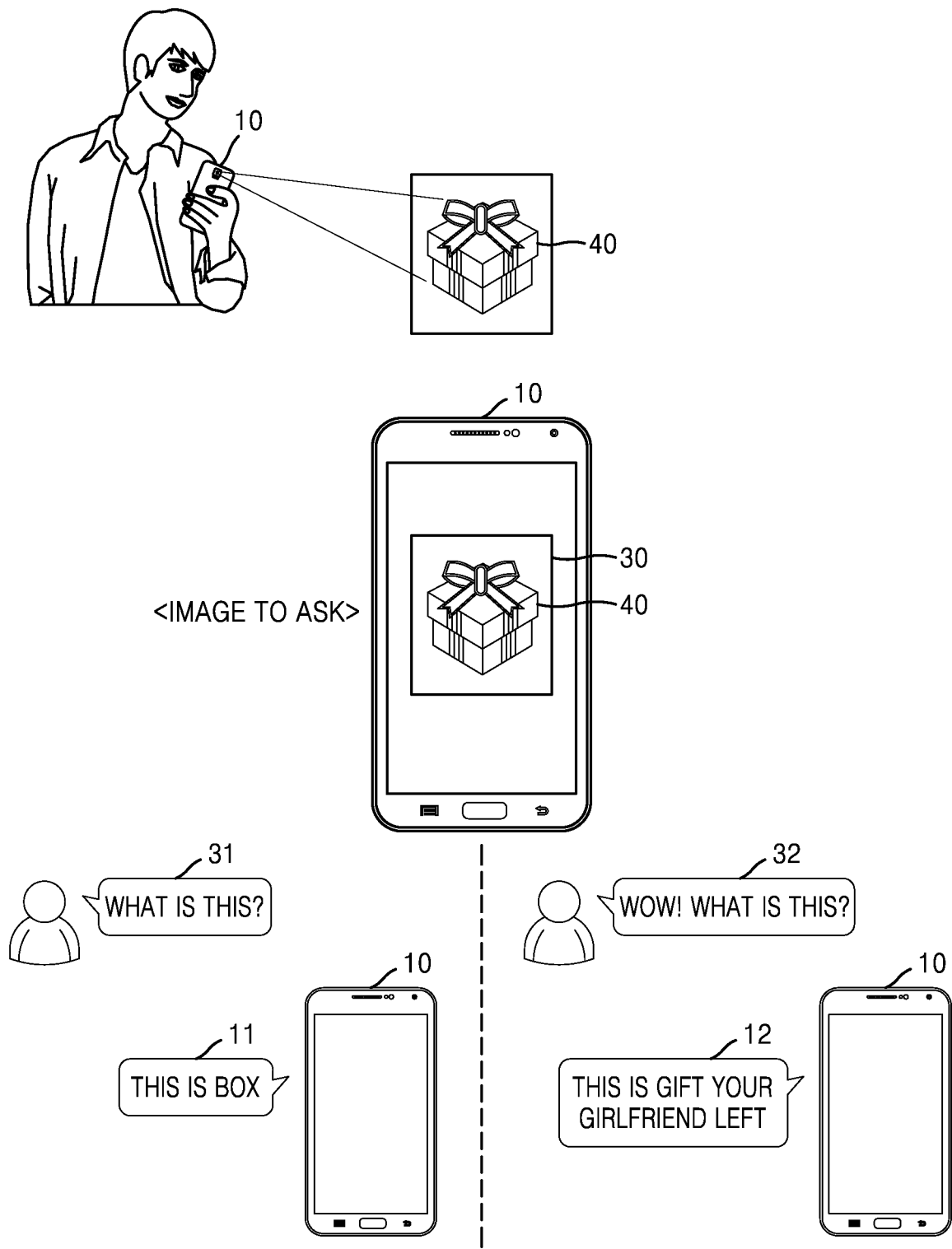
FIG. 1 is a diagram for describing an example in which a device provides a response to a user's voice input, according to an embodiment.

According to an aspect of the present disclosure, a method of providing a response to a user's voice input, performed by a device, includes capturing, via a camera of the device, an image including at least one object; activating a microphone of the device as the image is captured; receiving, via the microphone, the user's voice input for the at least one object; determining an intention of the user with respect to the at least one object by analyzing the received voice input; and providing a response regarding the at least one object based on the determined intention of the user.

According to another aspect of the present disclosure, a device for providing a response to a user's voice input includes an input unit configured to capture, via a camera of the device, an image including at least one object and receive, via a microphone of the device, the user's voice input for the at least one object; a memory configured to store at least one instruction; and at least one processor configured to execute the at least one instruction stored in the memory, wherein the at least one processor is further configured to execute the at least one instruction to: activate the microphone of the device as the image is captured, determine an intention of the user with respect to the at least one object by analyzing the voice input received via the microphone, and provide a response regarding the at least one object based on the determined intention of the user.

According to another aspect of the present disclosure, a non-transitory computer-readable recording medium having recorded thereon a program for executing the method in a computer.

MODE OF DISCLOSURE

Some embodiments of the present disclosure may be represented by block components and various process operations. All or some of such functional blocks may be implemented by various numbers of hardware and/or software components which perform specific functions. For example, functional blocks of the present disclosure may be implemented with one or more microprocessors or circuit elements for a specific function. The functional blocks of the present disclosure may also be implemented with various programming or scripting languages. Functional blocks may be implemented as an algorithm executed in one or more processors. Furthermore, the present disclosure may employ any number of conventional techniques for electronics configuration, signal processing and/or control, data processing and the like. The term "mechanism", "element", "means", or "component" is used broadly and is not limited to mechanical or physical embodiments.

Connecting lines or connecting members between elements shown in the drawings are intended to merely illustrate functional connections and/or physical or circuit connections. In an actual device, connections between elements may be indicated by replaceable or added various functional connections, physical connections, or circuit connections.

Hereinafter, the present disclosure will be described with reference to the accompanying drawings.

FIG. 1 is a diagram for describing an example in which a device provides a response to a user's voice input, according to an embodiment.

Referring to FIG. 1, a user may capture the image of an object 40 by using a device 10. The user may ask a question about the object 40 included in the captured image. In addition, the device 10 may display an image 30 including the object 40 on the screen of the device 10 and the user may ask a question about the object 40 included in the displayed image 30.

The device 10 may determine what the intention of the user's question 31 or 32 is by analyzing the user's question 31 or 32. The device 10 may provide a response to the object 40 based on the intention of the user's question 31 or 32. In this case, the device 10 may learn criteria to provide a response to the object 40 based on criteria for determining what the intention of the user's question 31 or 32 is and the determined intention of the user.

In an embodiment, the intention of the user with respect to the object may be determined based on the user's intonation information, the user's emotion information, and the type of language used by the user, but it is not limited thereto.

In an embodiment, the device 10 may provide different responses 10 and 11 when the user's intonation patterns are different, even if the same phrase is included in the user's questions.

For example, the captured image 30 may include a gift box. When the user asks a question 31 (that is, 'What is this?') for the captured image 30, the device 10 may determine that the intention of the user is to ask what the object 40 included in the image 30 is, and may provide a response 11 stating 'This is a box.'. When the user asks a question 32 (that is, 'Wow! What is this?') for the captured image 30, the device 10 may determine that the intention of the user is to ask who gave a gift box, and may provide a response 12 stating 'This is a gift your girlfriend left.'. Even if the user's questions 31 and 32 include the same phrase 'What is this?', the device 10 may provide different responses 11 and 12 to the questions 31 and 32 because the user's intonation patterns respectively included in the questions 31 and 32 are different.

Meanwhile, an image 30 including a gift box may be displayed on the device 10, and the user may ask the questions 31 and 32 about the displayed image 30.

The device 10 may include a home service robot, a smart phone, a tablet PC, a PC, a smart TV, a mobile phone, a personal digital assistant (PDA), a laptop, a media player, a micro server, a global positioning system (GPS) device, an electronic book terminal, a digital broadcasting terminal, a navigation device, a kiosk, an MP3 player, a digital camera, a wearable device, or other mobile or non-mobile computing devices, but it is not limited thereto. In addition, the device 10 may include various devices capable of receiving a touch input, for example, an electronic blackboard, a touch table, and the like. Also, the device 10 may include a watch, glasses, a hair band, and rings, which have communication and data processing capabilities.

In addition, the device 10 may include a camera (not shown) and a microphone (not shown). The camera (not shown) may photograph the object 40 through an image sensor in a photographing mode. The microphone (not shown) receives an external sound signal and processes the received external sound signal as electrical voice data. For example, the microphone (not shown) may receive a sound signal from an external device or speaker. The microphone (not shown) may use various noise reduction algorithms to remove noise generated in receiving an external sound signal.

Figure 2:
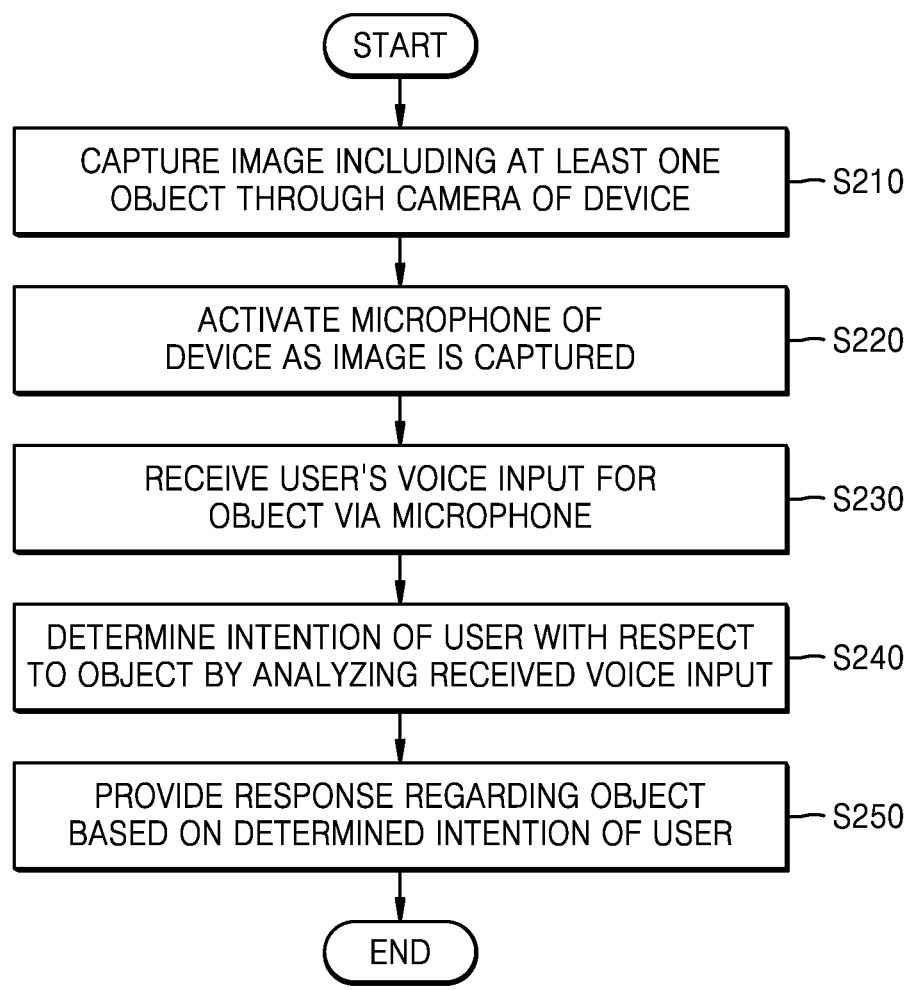
FIG. 2 is a flowchart of a method of providing a response to a user's voice input, according to an embodiment.

FIG. 2 is a flowchart of a method of providing a response to a user's voice input, according to an embodiment.

Referring to FIG. 2, in operation S210, the device 10 may capture an image including at least one object through a camera of the device 10. In an embodiment, the device 10 may display capture an image including at least one object by using the camera, and then display the captured image. In addition, the device 10 may display an image stored in an internal memory. In addition, the device 10 may display an image received through communication with an external server or an external device.

In operation S220, the device 10 may activate a microphone of the device 10 as the image is captured. In an embodiment, the device 10 may activate the microphone of the device 10 while an image including at least one object is displayed.

In an embodiment, the device 10 may automatically activate the microphone as the image is captured. In another embodiment, the device 10 may automatically activate the microphone while the image is displayed. In another embodiment, the device 10 may activate the microphone after receiving a user input to activate the microphone.

In operation S230, the device 10 may receive the user's voice input for an object via the microphone. In an embodiment, the user's voice input is in the form of a voice waveform, and the device 10 may receive the voice waveform of the user through the microphone and process the received voice waveform as electrical voice data.

In operation S240, the device 10 may determine the intention of the user with respect to the object by analyzing the received voice input. In an embodiment, the device 10 may analyze the user's voice waveform in units of euphony having a predetermined length. In addition, the device 10 may analyze the user's voice waveform in units of euphony, based on frequency.

The device 10 may analyze the received voice input to obtain user intonation information, user emotion information, and information about the type of language used by the user. In an embodiment, the device 10 may analyze voice energy (dB), sound pitch (Hz), shimmer of the voice waveform, and a change rate (zitter) of vocal fold vibration, and the like included in the received voice input to obtain user intonation information, user emotion information, and information about the type of language used by the user. However, the present disclosure is not limited thereto. For example, the type of language may include English, Japanese, Korean, and the like. Also, for example, the type of language may include local dialects.

The device 10 may determine the intention of the user with respect to the object based on the obtained user intonation information, user emotion information, and information about the type of language used by the user. In an embodiment, even if the user asks questions including the same phrase, the device 10 may determine that the intentions of the user are different according to the user intonation information, the user emotion information, and the like.

For example, the device 10 may receive the user's voice input 'What is this?' for a gift box included in an image captured by the device 10. Intonation information and emotion information generated as the device 10 analyzes the voice input 'What is this?' may include information indicating that the user, when reading a sentence, slightly raises the intonation at the end of the sentence and that the emotional state of the user is calm. The device 10 may use the generated intonation information and emotion information to determine that the intention of the user is to ask what an object (i.e., a gift box) included in the captured image is.

Also, for example, intonation information and emotion information generated as the device 10 analyzes the voice input 'What is this?' may include information indicating that the user, when reading a sentence, amply raises the intonation at the end of the sentence and the emotional state of the user is that of surprise and joy. The device 10 may use the generated intonation information and emotion information to determine that the intention of the user is to ask who gave the gift box.

In another example, the device 10 may receive the user's voice input 'What is this?' with respect to a gift box included in an image being displayed on the device 10.

In operation S250, the device 10 may provide a response regarding the object based on the determined intention of the user. In an embodiment, even if the user asks questions including the same phrase, the device 10 may provide different responses based on the determined intention by determining that the intentions of the user are different according to intonation information, emotion information, and the like.

For example, the device 10 may receive the user's voice input 'What is this?' for a gift box included in a captured image. When the device 10 determines that the intention of the user is to ask what the object (i.e., a gift box) included in the captured image is, the device 10 may provide a response 'This is a box.' based on the determined intention of the user. When the device 10 determines that the intention of the user is to ask who gave the gift box, as a result of analyzing the user's voice input, the device 10 may provide a response 'This is a gift your girlfriend left' based on the determined intention of the user.

In an embodiment, the device 10 may determine the intention of the user' question 'what is this?' for the gift box being displayed on the device 10.

The device 10 may extract text information included in the received voice input. Also, the device 10 may provide a response regarding the object based on the extracted text information and the determined intention of the user.

Figure 3:
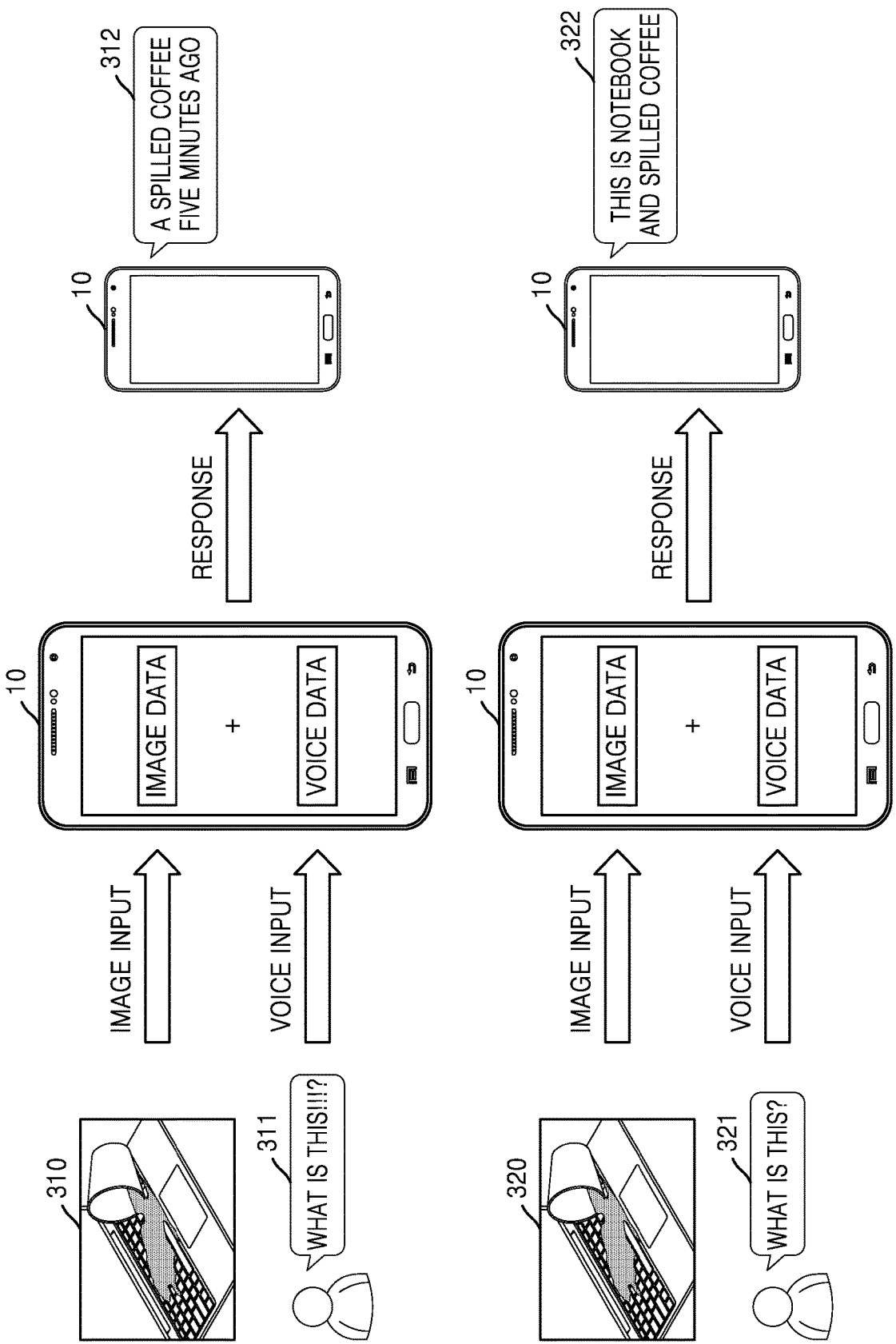
FIG. 3 is a diagram for describing an example of providing a response to a user's voice input by using user intonation information, according to an embodiment.

FIG. 3 is a diagram for describing an example of providing a response to a user's voice input by using user intonation information, according to an embodiment.

Referring to FIG. 3, the device 10 may receive image inputs 310 and 320 and voice inputs 311 and 321. The device 10 may convert the received image inputs 310 and 320 and the received voice inputs 311 and 321 into data formats that may be processed by the device 10.

Also, the device 10 may generate user intonation information by analyzing the voice inputs 311 and 321 of the user. In an embodiment, the device 10 may generate intonation information by analyzing voice energy (dB), sound pitch (Hz), shimmer of the voice waveform, and a change rate (zitter) of vocal fold vibration, and the like in the user's voice input. However, a method of generating the intonation information is not limited thereto.

In addition, the device 10 may use the generated intonation information to determine the intention of the user with respect to the image inputs 310 and 320. In an embodiment, the device 10 may select an object in the image inputs 310 and 320 that are targets of the user's voice inputs 311 and 321, based on the image inputs 310 and 320 and the voice inputs 311 and 321. The device 10 may use the generated intonation information to determine the intention of the user with respect to the selected object.

Also, the device 10 may provide a response regarding the object based on the determined intention of the user.

For example, the device 10 may receive image inputs 310 and 320 regarding a situation in which coffee is spilled over a notebook. When the device 10 receives the user's voice input 311 (that is, 'What is this!!!?') for the image input 310, intonation information generated as the device 10 analyzes the voice input 311 may include information indicating that the user uses a high and strong intonation at the end of a sentence. The device 10 may use the generated intonation information to determine that the intention of the user is to ask who has spilled coffee on the notebook. The device 10 may provide a response 'A spilled coffee five minutes ago.' to the user's voice input 311 (that is, 'What is this!!!?'), based on the determined intention of the user.

In addition, for example, When the device 10 receives the user's voice input 321 (that is, 'What is this?') for the image input 320, intonation information generated as the device 10 analyzes the voice input 321 may include information indicating that the user, when reading a sentence, slightly raises the intonation at the end of a sentence. The device 10 may use the generated intonation information to determine that the intention of the user is to ask what an object included in the image input 320 is. The device 10 may provide a response 'This is a notebook and spilled coffee.' to the user's voice input 321 (that is, 'What is this?'), based on the determined intention of the user.

Figure 4:
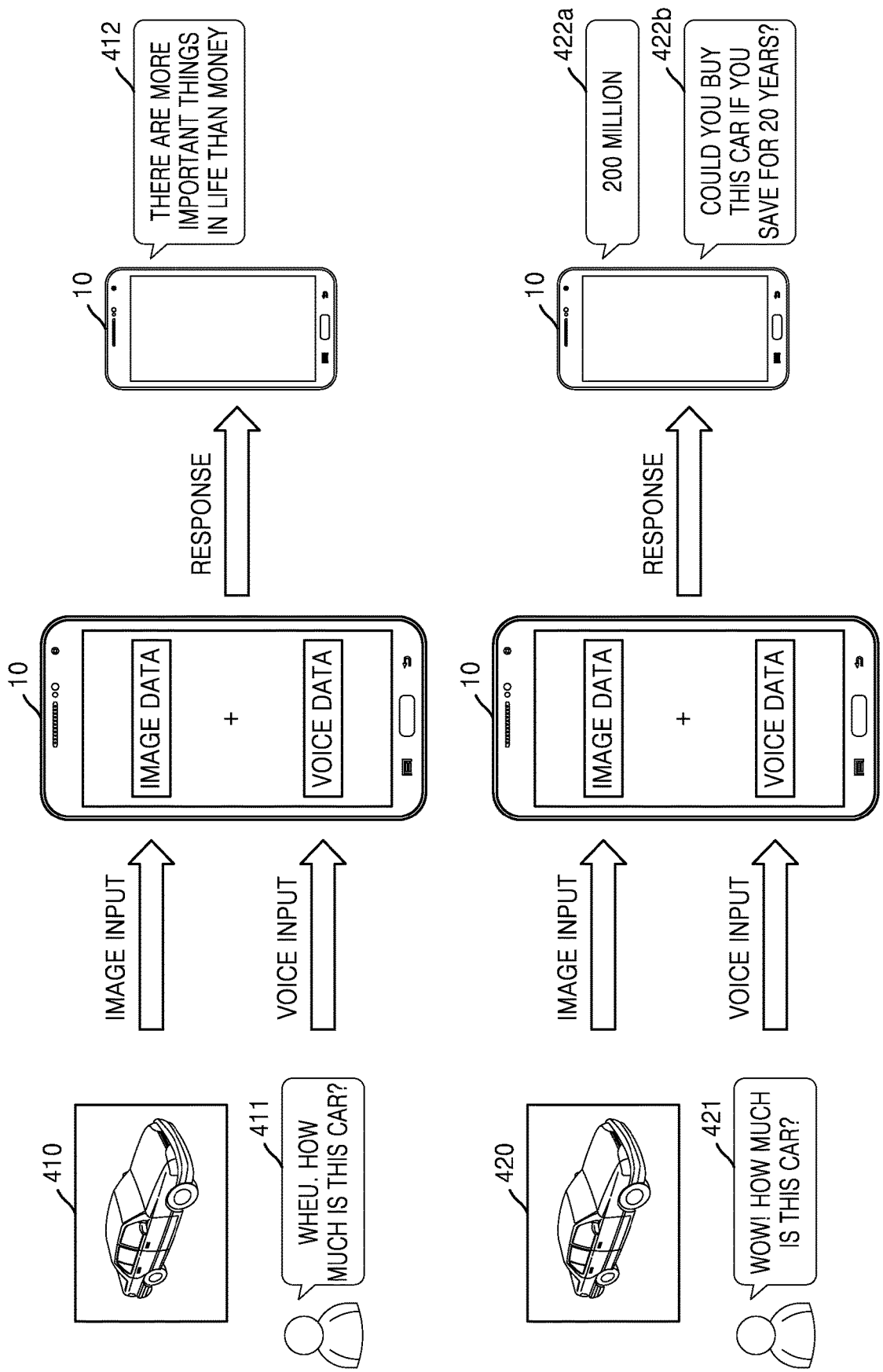
FIG. 4 is a diagram for describing an example of providing a response to a user's voice input by using user emotion information, according to an embodiment.

FIG. 4 is a diagram for describing an example of providing a response to a user's voice input by using user emotion information, according to an embodiment.

Referring to FIG. 4, the device 10 may receive image inputs 410 and 420 and voice inputs 411 and 421. The device 10 may generate user intonation information by analyzing the voice inputs 411 and 421 of the user. In addition, the device 10 may generate user emotion information by analyzing the generated intonation information. The user emotion information may include information indicating the user's emotional state such as joy, sadness, anger, etc., but it is not limited thereto.

Also, the device 10 may determine the intention of the user with respect to an object based on the generated emotion information. Also, the device 10 may provide a response regarding the object based on the generated emotion information. The device 10 may provide the user with a response based on user intonation information and user emotion information, in addition to the meaning of the text included in the user's voice inputs 411 and 421.

For example, the device 10 may receive image inputs 410 and 420 for expensive foreign cars. When the device 10 receives the user's voice input 411 (that is, 'Whew. How much is this car?') for the image input 410, emotion information generated as the device 10 analyzes the intonation information of the voice input 411 may include information related to negative emotions such as sadness and self-deprecation. The device 10 may use the generated emotion information to determine that the intention of the user is to lament the user's current situation rather than to ask the actual price of the foreign car photographed by the device 10. The device 10 may provide a response 412 stating 'There are more important things in life than money.', based on the determined intention.

Also, for example, when the device 10 receives the user's voice input 421 (that is, 'Wow! How much is this car?') for the image input 420, emotion information generated as the device 10 analyzes the intonation information of the voice input 421 may include information such as curiosity and surprise. The device 10 may use the generated emotion information to determine that the intention of the user is to ask the price of the foreign car photographed by the device 10. The device 10 may provide a response '200 million' to the user's voice input 421 (that is, 'Wow! How much is this car?'), based on the determined intention of the user.

When the user's emotion information includes information related to positive emotions such as joy, cheers, and curiosity, the device 10 may provide a witty response considering the user's emotion information. For example, when the device 10 receives the user's voice input 421 (that is, 'Wow! How much is this car?') for the image input 420, the device 10 may provide a response 422b stating 'Could you buy this car if you save for 20 years?'.

Figure 5:
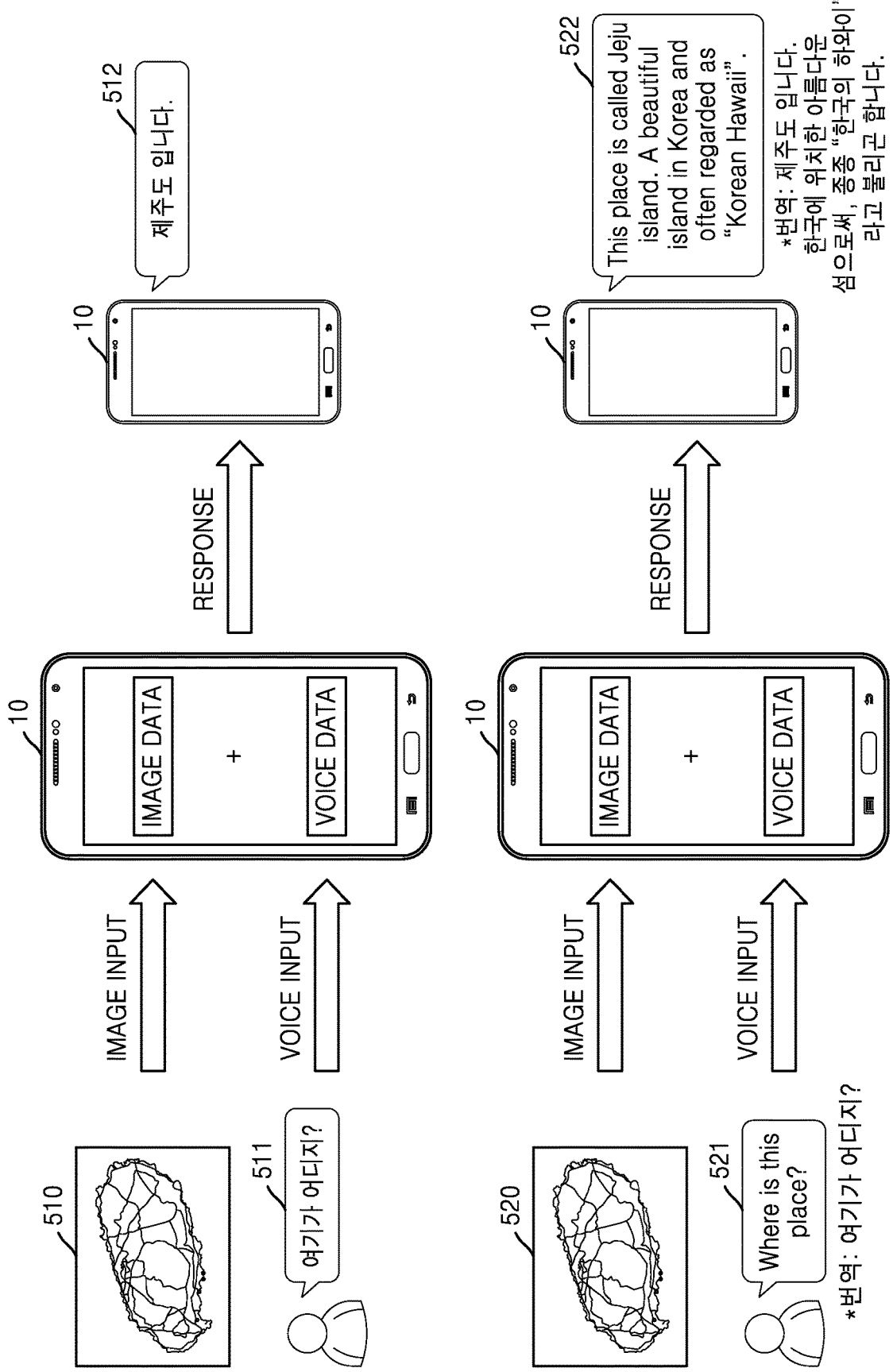
FIG. 5 is a diagram for describing an example of providing a response to a user's voice input, based on the type of language used by a user, according to an embodiment.

FIG. 5 is a diagram for describing an example of providing a response to a user's voice input, based on the type of language used by a user, according to an embodiment.

Referring to FIG. 5, the device 10 may receive image inputs 510 and 520 and voice inputs 511 and 521. The device 10 may determine the type of language used by the user by analyzing the voice inputs 511 and 521 of the user. The type of language may include, but is not limited to, Korean, English, Chinese, and the like. Each language has its own intonation, which is different from those of other languages, and the device 10 may determine the type of language used by the user by analyzing intonation information of the user's voice inputs 511 and 521.

The device 10 may provide a response regarding an object by using the determined type of language. In addition, the device 10 may determine a background knowledge level of the user in consideration of the social and cultural background of a country using the determined language and may provide a response regarding the object based on the determined background knowledge level of the user.

For example, the device 10 may receive image inputs 510 and 520 for a map of Jeju Island. When the device 10 receives the user's voice input 511 (that is, '여 기가 어디지?') for the image input 510, the device 10 may determine that the language used by the user is Korean and may provide a response 512 in Korean. Also, after the device 10 determines that the user is Korean because the user uses Korean, the device 10 may provide the response 512 based on the background knowledge level of Koreans. The device 10 may determine that, if the user is Korean, the user has a basic background knowledge such as that Jeju Island is an island of the Republic of Korea, and the device 10 may provide a simple response 512 stating '제주도 입니다'.

In addition, for example, when the device 10 receives the user's voice input 521 (that is, 'Where is this place?') for the image input 520, the device 10 may determine that the type of language used by the user is of English and may provide a response 522 in English. Also, after the device 10 determines that the user is not Korean because the user uses English, the device 10 may provide the response 522 based on the background knowledge level of foreigners (that is, nationals of countries using English). The device 10 may determine that the foreigner does not have the basic background knowledge of the Jeju Island, and the device 10 may provide the background knowledge of the Jeju Island in addition to the response 522. The device 10 may provide a response 522 stating 'This place is called Jeju island. A beautiful island in Korea and often regarded as "the Hawaii of Korea"'(translation: 제주도 입니다. 한국에 위치한 아름다운 섬으로써, 종종 "한국의 하와이"라고 불리곤 합니다).

The device 10 may select an object that is a target of the user's voice input, based on the determined type of language. In an embodiment, an image input received by the device 10 may include a plurality of objects. The device 10 may select any one of the plurality of objects included in the image input, based on the determined type of language. Also, the device 10 may use generated intonation information to determine the intention of the user with respect to the selected object.

For example, the device 10 may receive image input that includes both red pepper paste and marshmallow. When the device 10 receives the user's voice input '이게 뭐야?' for the image input, the device 10 may determine that the language used by the user is Korean. Also, the device 10 may determine that the user is Korean because the user uses Korean, based on the determined type of language, and may provide a response based on the background knowledge level of Koreans. The device 10 may determine that Koreans will know red pepper paste, and may provide a response '이것 은 마시 멜로우 입니다.'.

Also, for example, when the device 10 receives the user's voice input 'What's this?' with respect to the image input that includes both red pepper paste and marshmallow, the device 10 may determine that the language used by the user is of English. Also, the device 10 may determine that the user is a foreigner because the user uses English, based on the determined type of language, and may provide a response based on the background knowledge level of foreigners (that is, nationals of countries using English). The device 10 may determine that foreigners will know marshmallow, and may provide a response 'This is red pepper paste.'.

Figure 6:
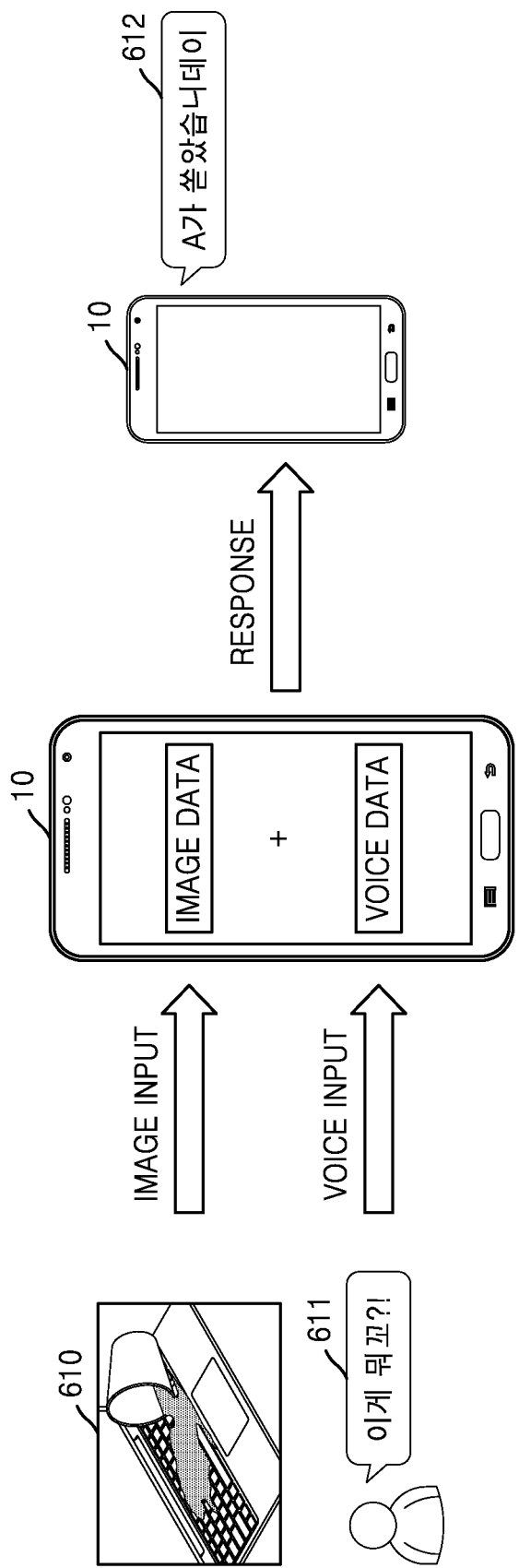
FIG. 6 is a diagram for describing an example of providing a response to a user's voice input, based on a dialect used by a user, according to an embodiment.

FIG. 6 is a diagram for describing an example of providing a response to a user's voice input, based on a dialect used by a user, according to an embodiment. Hereinafter, descriptions that are the same as those given with reference to FIG. 5 will be omitted for convenience.

Referring to FIG. 6, the device 10 may receive an image input 610 and a voice input 611. The device 10 may determine the type of dialect used by the user by analyzing the voice input 611 of the user. The type of dialect may include a plurality of dialects of Korean, a plurality of dialects of Japanese, and a plurality of dialects of English. For example, the plurality of dialects of Korean may include Gyeong sang-do dialect and Jeolla-do dialect. However, the type of dialect is not limited thereto. Each dialect has its own intonation, which is different from those of other dialects, and the device 10 may determine the type of dialect used by the user by analyzing intonation information of the user's voice input 611.

For example, the device 10 may receive an image input 610 regarding a situation in which coffee is spilled over a notebook. When the device 10 receives the user's voice input 611 (that is, '이게 뭐꼬?') for the image input 610, the device 10 may determine that the type of dialect used by the user is of the Gyeongsang-do dialect of Korean. In addition, the device 10 may provide a response 'A가 쏟았습니데이' by using the Gyeongsang-do dialect.

Figure 7:
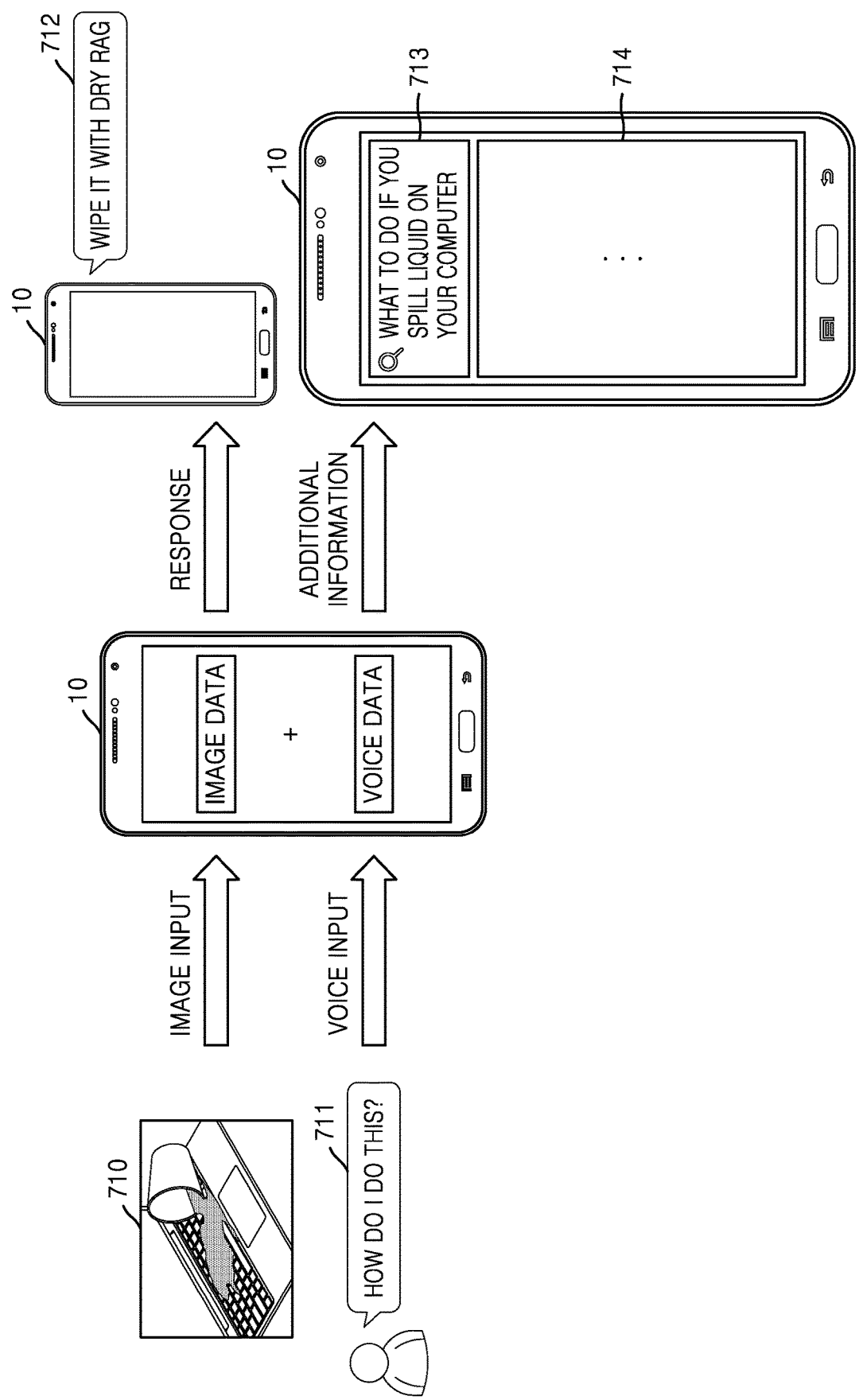
FIG. 7 is a diagram for describing an example of providing a response to a user's voice input together with additional information related to the intention of the user, according to an embodiment.

FIG. 7 is a diagram for describing an example of providing a response to a user's voice input together with additional information related to the intention of the user, according to an embodiment.

Referring to FIG. 7, the device 10 may receive an image input 710 and a voice input 711. The device 10 may determine the intention of the user with respect to an object by analyzing the voice input 711 of the user.

For example, the device 10 may receive an image input 710 regarding a situation in which coffee is spilled over a notebook. When the device 10 receives the user's voice input 711 (that is, 'How do I do this?') for the image input 410, intonation information generated as the device 10 analyzes the voice input 711 may include information that the user uses an intonation that is slightly raised at the end of a sentence and sounds somewhat blurred. The device 10 may use the generated intonation information to determine that the intention of the user is to ask how to remove the coffee spilled on the notebook. The device 10 may provide a response 712 'Wipe it with a dry rag.' to the user's voice input 711 (that is, "How do I do this?"), based on the determined intention of the user.

In addition, the device 10 may generate a search word 713 based on the intention of the user. The device 10 may perform a search using the search word 713 generated through an Internet search engine or the like to thereby provide a response 712 and a search result 714 to the user.

For example, based on the intention of the user to ask how to remove the coffee spilled on the notebook, the device 10 may generate a search word 713 stating 'How to do if you spill liquid on your computer', and provide a search result 714 and a response 712 by performing a search using the generated search word 713.

In an embodiment, the device 10 may perform a search by using an automatically generated search word. Also, the device 10 may perform a search by using a search word after receiving a user input such as clicking a search execution button.

Figure 8:
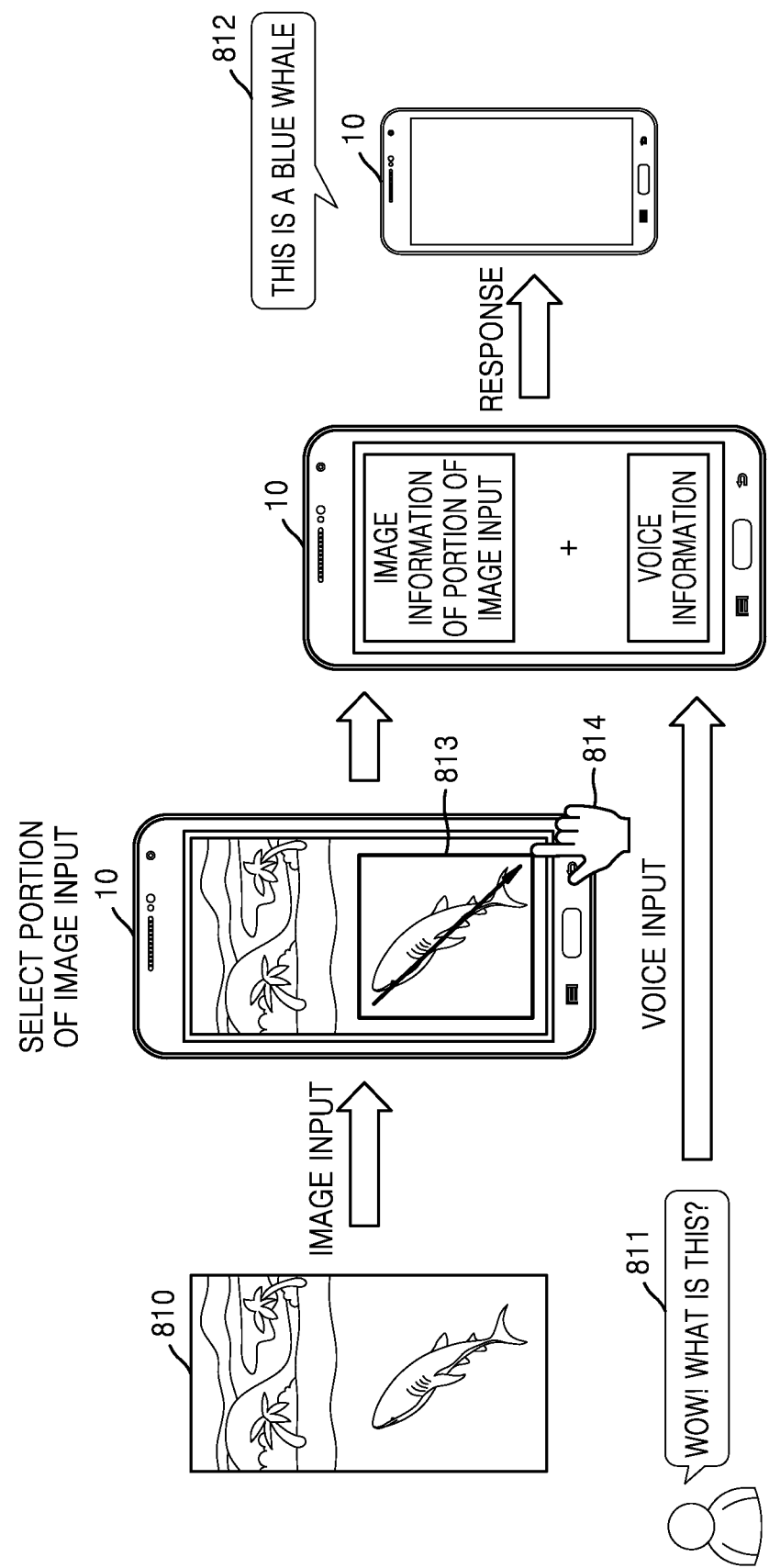
FIG. 8 is a diagram for describing an example of providing a response to a user's voice input, with respect to a portion of a displayed image, according to an embodiment.

FIG. 8 is a diagram for describing an example of providing a response to a user's voice input, with respect to a portion of a displayed image, according to an embodiment.

Referring to FIG. 8, the device 10 may receive an image input 810 and a voice input 811. The device 10 may generate user intonation information by analyzing the voice input 811 of the user. The device 10 may use the generated intonation information to determine the intention of the user with respect to the image input 810. The device 10 may provide a response regarding an object based on the determined intention of the user.

The device 10 may receive a user input 814 for selecting some area of an image displayed on the device 10. Also, the device 10 may provide a response to an object in a selected area of the image based on the determined intention of the user.

For example, the device 10 may receive image input 810 that includes both a whale and an island. The device 10 may receive a user input 814 for selecting an area 813 including a whale in the displayed image. The target of the user's voice input 811 (that is, 'Wow! What is this?') received by the device 10 may be determined to be a whale in the area 813 selected by the user. When the area 813 of the image input 810 is not selected by the user, the device 10 may determine that the target of the user's voice input 811 (that is, 'Wow! What is this?') is an island. In this case, the device 10 may provide a response to the island even if the intention of the user is related to a question about the whale.

The device 10 may use intonation information generated from the user's voice input 811 (that is, 'Wow! What is this?') to determine that the intention of the user is to ask what the object in the area 813 is. The device 10 may provide a response 'This is a blue whale.' to the user's voice input 811 (that is, 'Wow! What is this?'), based on the determined intention of the user.

Among the descriptions given with reference to FIGS. 4 to 8 above, descriptions that are the same as those given with reference to FIG. 3 have been omitted for convenience.

Figure 9:
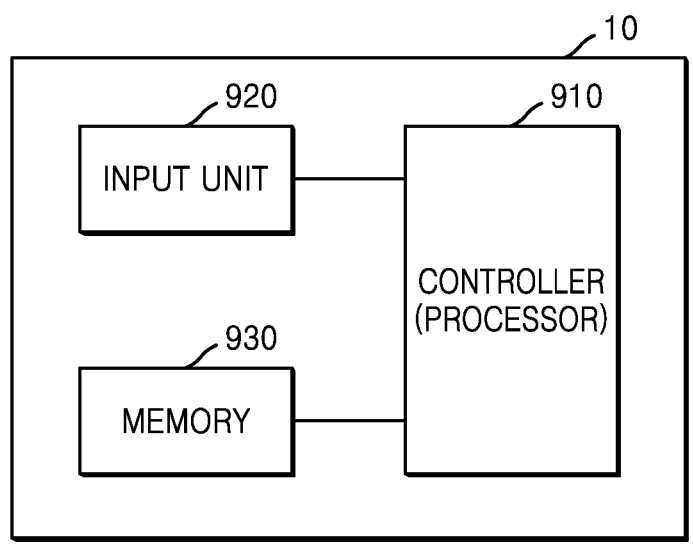
FIGS. 9 and 10 are block diagrams of a device according to an embodiment.
Figure 10:
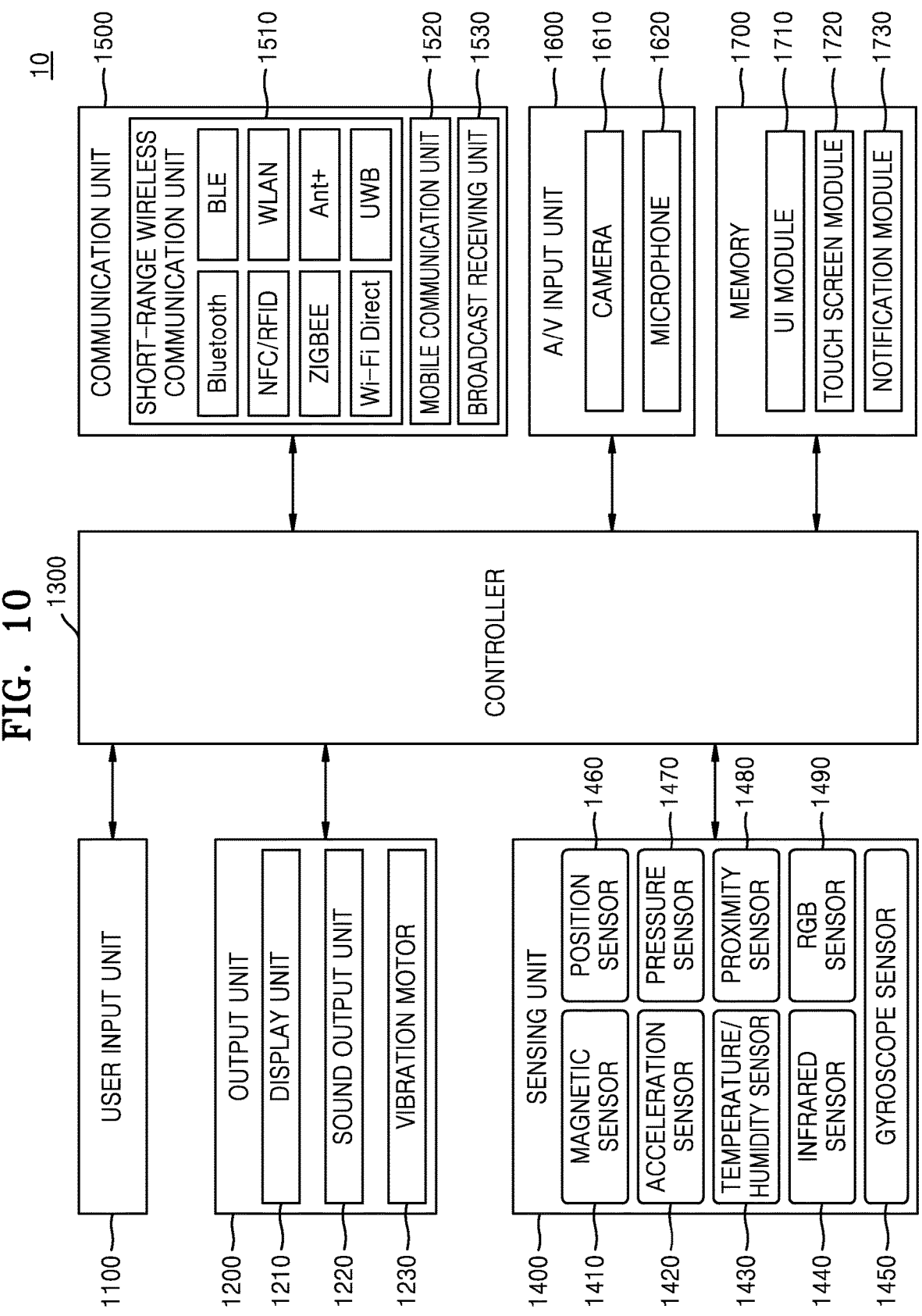

FIGS. 9 and 10 are block diagrams of a device 10 according to an embodiment.

As shown in FIG. 9, the device 10 according to an embodiment may include a user controller 910 that is a processor, an input unit 920, and a memory 930. However, not all of the components shown in FIG. 9 are essential components of the device 10. The device 10 may be configured with more components than those shown in FIG. 9 or with less components than those shown in FIG. 9.

For example, as shown in FIG. 10, the device 10 according to an embodiment may include a communication unit 1500, a sensing unit 1400, and an audio/video (A/V) input unit 1600 in addition to a user input unit 1100, an output unit 1200, and a controller 1300 that is a processor.

The user input unit 1100 refers to a unit through which a user inputs data for controlling the device 10. For example, the user input unit 1100 may include a key pad, a dome switch, a touch pad (a contact-based capacitive type, a pressure-based resistive type, an infrared detection type, a surface ultrasonic wave conduction type, an integral tension measurement type, a piezo effect type, etc.), a jog wheel, a jog switch, and the like, but is not limited thereto.

The output unit 1200 may output an audio signal, a video signal, or a vibration signal. The output unit 1200 may include a display unit 1210, a sound output unit 1220, and a vibration motor 1230, but is not limited thereto.

The display unit 1210 displays information to be processed by the device 10. For example, the display unit 1210 may display an image including at least one object, input to the device 10. The device 10 may capture an image including at least one object by using a camera, and then the display unit 1210 may display the captured image. In addition, the display unit 1210 may display an image stored in an internal memory. In addition, the display unit 1210 may display an image received through communication with an external server or an external device.

When the display unit 1210 and a touch pad are layered to form a touch screen, the display unit 1210 may be used as an input device as well as the output device. The display unit 1210 may include at least one of a liquid crystal display, a thin film transistor-liquid crystal display, an organic light-emitting diode, a flexible display, a 3D display, or an electrophoretic display. Also, according to a form in which the device 10 is realized, the device 10 may include two or more display units 1210. In this case, the two or more display units 1210 may be arranged to face each other by using a hinge.

The sound output unit 1220 may output audio data received from the communication unit 1500 or stored in the memory 1700. Also, the sound output unit 1220 may output sound signals related to functions (for example, a call signal reception sound, a message reception sound, a notification sound, etc.) performed by the device 10. The sound output unit 1220 may include a speaker, a buzzer, etc.

The vibration motor 1230 may output a vibration signal. For example, the vibration motor 1230 may output a vibration signal corresponding to audio data or video data (for example, a call signal reception sound, a message reception sound, etc.). In addition, the vibration motor 1230 may output a vibration signal when a touch is input to the touch screen.

The controller 1300 may generally control overall operations of the device 10. For example, the controller 1300 may execute programs stored in the memory 1700 to generally control the user input unit 1100, the output unit 1200, the sensing unit 1400, the communication unit 1500, the A/V input unit 1600, etc.

The controller 1300 may perform the operations of the device 10 described above with reference to FIGS. 1 to 8 and operations of the device 10 to be described below with reference to FIGS. 11 to 14.

Specifically, the controller 1300 may activate a microphone as an image is captured. In an embodiment, the controller 1300 may automatically activate the microphone as an image is captured, or while the image is being displayed, and in another embodiment, the controller 1300 may activate the microphone after receiving a user's input for activating the microphone. In addition, the controller 1300 may activate the microphone as an image including an object is captured.

The controller 1300 may receive the user's voice waveform through the microphone and process the voice waveform as electrical voice data.

The controller 1300 may determine the intention of the user with respect to the object by analyzing the received voice input. In an embodiment, the controller 1300 may analyze the user's voice waveform in units of euphony having a predetermined length. In addition, the controller 1300 may analyze the user's voice waveform in units of euphony, based on frequency.

The controller 1300 may analyze the received voice input to obtain user intonation information, user emotion information, and information about the type of language used by the user. In an embodiment, the controller 1300 may analyze voice energy (dB), sound pitch (Hz), shimmer of the voice waveform, and a change rate (zitter) of vocal fold vibration, and the like included in the received voice input to obtain user intonation information, user emotion information, and information about the type of language used by the user. However, the present disclosure is not limited thereto. For example, the type of language may include English, Japanese, Korean, and the like. Also, for example, the type of language may include local dialects.

The controller 1300 may determine the intention of the user with respect to the object based on the obtained user intonation information, user emotion information, and information about the type of language used by the user. In an embodiment, even if the user asks questions including the same phrase, the controller 1300 may determine that the intentions of the user are different according to the user intonation information, the user emotion information, and the like.

The controller 1300 may provide a response regarding an object based on the determined intention of the user. In an embodiment, even if the user asks questions including the same phrase, the controller 1300 may provide different responses based on the determined intention by determining that the intentions of the user are different according to intonation information, emotion information, and the like.

The controller 1300 may extract text information included in the received voice input. Also, the controller 1300 may provide a response regarding the object based on the extracted text information and the determined intention of the user.

The sensing unit 1400 may sense the state of the device 10 or a state around the device 10 and may transmit sensed information to the controller 1300.

The sensing unit 1400 may include at least one of a magnetic sensor 1410, an acceleration sensor 1420, a temperature/humidity sensor 1430, an infrared sensor 1440, a gyroscope sensor 1450, a position sensor (e.g., GPS) 1460, an air pressure sensor 1470, a proximity sensor 1480, and an RGB sensor (i.e., illuminance sensor) 1490, but it is not limited thereto. Functions of sensors included in the sensing unit 1400 may be intuitively inferred by one of ordinary skill in the art from their names, and thus, detailed description thereof will be omitted.

The communication unit 1500 may include one or more components that allow the device 10 to communicate with an external device (not shown) or an external server. For example, the communication unit 1500 may include a short-range wireless communication unit 1510, a mobile communication unit 1520, and a broadcast receiving unit 1530.

The short-range wireless communication unit 1510 may include a Bluetooth communication unit, a Bluetooth low energy (BLE) communication unit, a near field communication (NFC) unit, a wireless local area network (WLAN) communication unit, a Zigbee communication unit, an infrared data association (IrDA) communication unit, a Wi-Fi direct (WFD) communication unit, an ultra wideband (UWB) communication unit, an Ant+ communication unit, etc., but it is not limited thereto.

The mobile communication unit 1520 may transmit and receive radio signals to and from at least one of a base station, an external terminal, and a server on a mobile communication network. In this case, the radio signals may include a voice call signal, a video call signal, or various types of data according to text/multimedia message transmission and reception.

The broadcast receiving unit 1530 receives broadcast signals and/or broadcast-related information from the outside through a broadcast channel. The broadcast channel may include a satellite channel and a terrestrial channel. The first device 1000 may not include the broadcast receiving unit 1530, according to an embodiment.

The communication unit 1500 may transmit and receive information required to predict the harmfulness of a next frame to and from an HMD device 2000, a server 4000, and a peripheral device 3000.

The AN input unit 1600 may be included for an input of an audio signal or a video signal and may include a camera 1610, a microphone 1620, etc. The camera 1610 may obtain an image frame, such as a still image or a video, through an image sensor in a video call mode or an image capture mode. The camera 1610 may photograph an object. An image captured through the image sensor may be processed through the controller 1300 or a separate image processing unit (not shown).

An image frame processed by the camera 1610 may be stored in the memory 1700 or may be transmitted to the outside via the communication unit 1500. Two or more cameras 1610 may be provided according to the configuration of the device.

The microphone 1620 receives an external sound signal and processes the received external sound signal as electrical voice data. For example, the microphone 1620 may receive a sound signal from an external device or speaker. The microphone 1620 may use various noise reduction algorithms to remove noise generated in receiving an external sound signal.

The memory 1700 may store a program for the processing and control of the controller 1300 and may store data input to or output from the device 10.

The memory 1700 may include at least one type of storage medium among a memory (e.g., SD or XD memory) of a flash memory type, a hard disk type, a multimedia card micro type, or a card type, random access memory (RAM), static random access memory (SRAM), read only memory (ROM), electrically erasable programmable read-only memory (EEPROM), programmable read-only memory (PROM), a magnetic memory, a magnetic disk, and an optical disk.

The programs stored in the memory 1700 may be classified into a plurality of modules according to their functions. For example, the programs may be classified into a user interface (UI) module 1710, a touch screen module 1720, a notification module 1730, and the like.

The UI module 1710 may provide a specialized UI or GUI and the like that are associated with the first device 1000 for each application. The touch screen module 1720 may sense a user's touch gesture on a touch screen and transmit information about the user's touch gesture to the controller 1300. The touch screen module 1720 according to an embodiment may recognize a touch code and analyse the touch code. The touch screen module 1720 may be configured with separate hardware including a controller.

Various sensors may be provided in or near the touch screen to sense the touch or near touch of the touch screen. An example of a sensor for sensing the touch of the touch screen is a tactile sensor. The tactile sensor refers to a sensor that detects the contact of a certain object with a sensitivity that is a degree or more than what a person feels. The tactile sensor may detect various type of information such as the roughness of a contact surface, the rigidity of a contact object, and the temperature of a contact point.

Another example of a sensor for sensing the touch of the touch screen is a proximity sensor.

The proximity sensor refers to a sensor that detects the presence or absence of an object approaching a predetermined detection surface or a nearby object without mechanical contact by using the force of an electromagnetic field or infrared rays. Examples of proximity sensors include a transmission-type photoelectric sensor, a direct reflection-type photoelectric sensor, a mirror reflection-type photoelectric sensor, a high frequency oscillation-type proximity sensor, a capacitive proximity sensor, a magnetic proximity sensor, and an infrared proximity sensor. The user's touch gestures may include tap, touch & hold, double tap, drag, panning, flick, drag and drop, swipe, etc.

The notification module 1730 may generate a signal for notifying the occurrence of an event of the first device 1000. Examples of events that occur in the first device 1000 may include call signal reception, message reception, key signal input, schedule notification, etc. The notification module 1730 may output a notification signal as a video signal through the display unit 1210, an audio signal through the sound output unit 1220, or a vibration signal through the vibration motor 1230.

Figure 11:
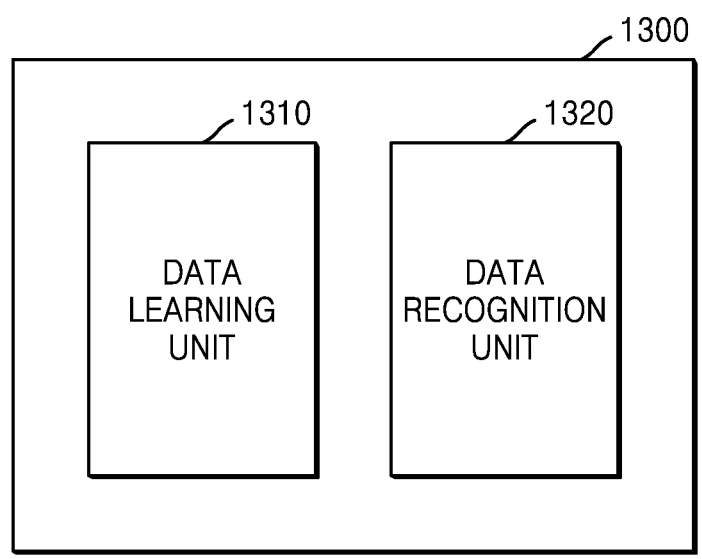
FIG. 11 is a block diagram of a controller according to an embodiment.

FIG. 11 is a block diagram of a controller 1300 according to an embodiment.

Referring to FIG. 11, the controller 1300 according to an embodiment may include a data learning unit 1310 and a data recognition unit 1320.

The data learning unit 1310 may learn a criterion for determining the intention of the user with respect to an object included in an image and a criterion for providing a response to the user's voice input in order to provide a response to the user's voice input. In an embodiment, the data learning unit 1310 may learn a predetermined criterion by using an image input and a voice input that are input to the data learning unit 1310. The data learning unit 1310 may learn which data included in the image input and the voice input has to be used to determine the intention of the user and provide a response, and may learn a criterion on how to determine the intention of the user by using data and a criterion on how to provide a response to the user's voice input. The data learning unit 1310 may obtain data to be used for learning and apply the obtained data to a data recognition model to be described later, to thereby learn a criterion for determining the intention of the user with respect to an object included in an image and a criterion for providing a response to the user's voice input.

The data recognition unit 1320 may determine the intention of the user with respect to the object included in the image and the response to the user's voice input, based on the data. The data recognition unit 1320 may use a learned data recognition model to determine the intention of the user with respect to the object included in the image and the response to the user's voice input from predetermined data. The data recognition unit 1320 may obtain predetermined data according to a criterion previously set through learning and use a data recognition model with the obtained data as an input value, to thereby determine the intention of the user with respect to an object included in an image and a response to the user's voice input based on a predetermined data. In addition, a resultant value output by the data recognition model with the obtained data as an input value may be used to update the data recognition model.

At least one of the data learning unit 1310 and the data recognition unit 1320 may be manufactured in the form of at least one hardware chip and mounted on an electronic device. For example, at least one of the data learning unit 1310 and the data recognition unit 1320 may be manufactured in the form of a dedicated hardware chip for artificial intelligence (AI), or may be manufactured as a portion of a conventional general purpose processor (e.g., a CPU or an application processor) or graphics-only processor (e.g., a GPU) and mounted on various electronic devices as described above.

In this case, the data learning unit 1310 and the data recognition unit 1320 may be mounted on one electronic device, or may be mounted on separate electronic devices, respectively. For example, one of the data learning unit 1310 and the data recognition unit 1320 may be included in an electronic device, and the other may be included in a server. The data learning unit 1310 and the data recognition unit 1320 may communicate with each other by wire or wirelessly, model information constructed by the data learning unit 1310 may be provided to the data recognition unit 1320, and data input to the data recognition unit 1320 may be provided to the data learning unit 1310 as additional learning data.

At least one of the data learning unit 1310 and the data recognition unit 1320 may be implemented as a software module. When at least one of the data learning unit 1310 and the data recognition unit 1320 is implemented as a software module (or a program module including instructions), the software module may be stored in non-transitory computer readable media. Also, in this case, at least one software module may be provided by an operating system (OS) or by a predetermined application. Alternatively, a portion of the at least one software module may be provided by an OS, and the remaining portion may be provided by a predetermined application.

Figure 12:
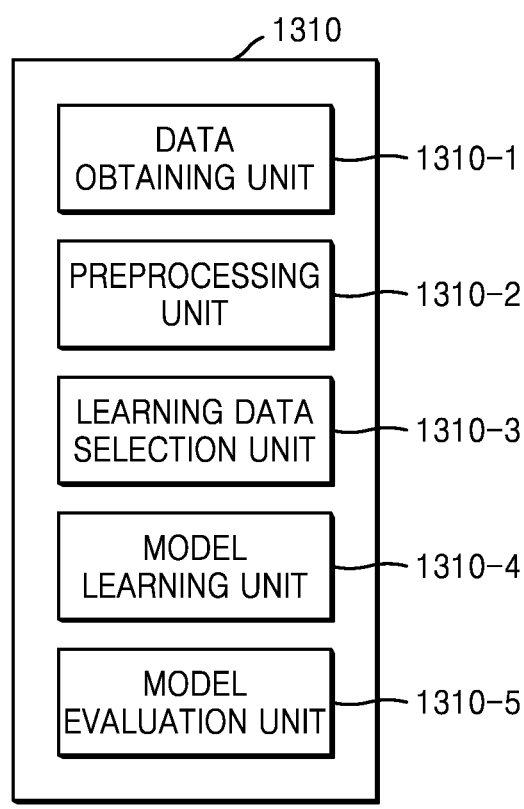
FIG. 12 is a block diagram of a data learning unit according to an embodiment.

FIG. 12 is a block diagram of a data learning unit 1310 according to an embodiment.

Referring to FIG. 12, the data learning unit 1310 according to an embodiment may include a data obtaining unit 1310-1, a preprocessing unit 1310-2, a learning data selection unit 1310-3, a model learning unit 1310-4, and a model evaluation unit 1310-5.

The data obtaining unit 1310-1 may obtain data required to determine the intention of the user with respect to an object included in an image and to provide a response to the user's voice input.

The data obtaining unit 1310-1 may receive a learning image and a learning voice to be used to obtain predetermined data. The learning image may include a plurality of images (or frames), and the learning voice may include a voice waveform. The data obtaining unit 1310-1 may receive a learning image and a learning voice through a camera and a microphone of an electronic device including the data learning unit 1310 or through an external camera (e.g., a CCTV, a black box, or the like) and a microphone which are capable of communicating with the electronic device including the data learning unit 1310. Here, the camera may include one or more image sensors (e.g., a front sensor or a rear sensor), a lens, an image signal processor (ISP), or a flash (e.g., an LED or xenon lamp).

For example, the data obtaining unit 1310-1 may obtain voice data, image data, text data, biometric signal data, or the like included in the learning image and the learning voice. For example, the data obtaining unit 1310-1 may receive data through an input device (e.g., a microphone, a camera, a sensor, or the like) of the electronic device. Alternatively, the data obtaining unit 1310-1 may obtain data through an external device that communicates with the electronic device.

The data obtaining unit may obtain user information such as sex, area, age, and preference information of the user.

The preprocessing unit 1310-2 may preprocess obtained data so that the obtained data may be used in a learning process for determining the intention of the user with respect to an object included in an image and a learning process for providing a response to the user's voice input. The preprocessing unit 1310-2 may process obtained data in a previously set format so that the model learning unit 1310-4 to be described later may use the obtained data in order to determine the intention of the user with respect to an object included in an image and to provide a response to the user's voice input.

For example, the preprocessing unit 1310-2 may extract voice data, image data, text data, biometric signal data, or the like included in an input learning image and an input learning voice and accumulate characteristics and result values extracted from input data, to thereby learn an criterion for determining the intention of the user with respect to an object included in an image and an criterion for providing a response to the user's voice input.

The learning data selection unit 1310-3 may select data required for learning from among preprocessed data. The selected data may be provided to the model learning unit 1310-4. The learning data selection unit 1310-3 may select data required for learning from among preprocessed data according to a previously set criterion for determining the intention of the user with respect to an object included in an image and a previously set criterion for providing a response to the user's voice input. Also, the learning data selection unit 1310-3 may select data according to a criterion previously set by learning by the model learning unit 1310-4 which will be described later.

The learning data selection unit 1310-3 may select data for determining the intention of the user with respect to an object included in an image and providing a response to the user's voice input from among the preprocessed data.

The model learning unit 1310-4 may learn a criterion on how to determine the intention of the user with respect to an object included in an image and a criterion on how to provide a response to the user's voice input, based on learning data. In addition, the model learning unit 1310-4 may learn a criterion on which learning data has to be used to determine the intention of the user with respect to an object included in an image and provide a response to the user's voice input.

For example, the model learning unit 1310-4 may learn a criterion on how to determine the intention of the user with respect to an object included in an image and a criterion on how to provide a response to the user's voice input, based on intonation information included in the user's voice input, emotion information, and the type of language used by the user.

Also, the model learning unit 1310-4 may learn, by using learning data, a data recognition model used to determine the intention of the user with respect to an object included in an image and provide a response to the user's voice input. In this case, the data recognition model may be a pre-built model. For example, the data recognition model may be a model built in advance based on received basic learning data (e.g., sample words, etc.). The data recognition model may be generated and learned for each user.

The data recognition model may be built considering the application field of the recognition model, the purpose of learning, or the computer performance of a device. The data recognition model may be, for example, a model based on a neural network. For example, models such as deep neural network (DNN), recurrent neural network (RNN), and bidirectional recurrent deep neural network (BRDNN) may be used as the data recognition model, but the present disclosure is not limited thereto.

According to various embodiments, when there are a plurality of data recognition models built in advance, the model learning unit 1310-4 may determine a data recognition model, which has a large relation between input learning data and basic learning data, as a data recognition model to be learned. In this case, the basic learning data may be pre-classified according to the type of data, and the data recognition model may be pre-built for each data type. For example, the basic learning data may be pre-classified by various criteria such as an area where the learning data is generated, a time at which the learning data is generated, a size of the learning data, a genre of the learning data, a creator of the learning data, and the type of object in the learning data.

In addition, the model learning unit 1310-4 may learn the data recognition model by using a learning algorithm including, for example, an error back-propagation or a gradient descent.

Also, the model learning unit 1310-4 may learn the data recognition model through, for example, supervised learning using learning data as an input value. Also, for example, the model learning unit 1310-4 may learn, by itself, the type of data required to determine the intention of the user with respect to an object included in an image and provide a response to the user's voice input and thus may learn a data recognition model through unsupervised learning that finds a criterion for determining the intention of the user with respect to an object included in an image and a criterion for providing a response to the user's voice input. Also, for example, the model learning unit 1310-4 may learn a data recognition model through reinforcement learning using feedback on whether the result of determining the intention of the user with respect to an object included in an image and the result of providing a response to the user's voice input, according to the learning, are correct.

When the data recognition model is learned, the model learning unit 1310-4 may store the learned data recognition model. In this case, the model learning unit 1310-4 may store the learned data recognition model in a memory of an electronic device including the data recognition unit 1320. Alternatively, the model learning unit 1310-4 may store the learned data recognition model in a memory of an electronic device including a data recognition unit 1320 to be described later. Alternatively, the model learning unit 1310-4 may store the learned data recognition model in a memory of a server connected to an electronic device with a wired or wireless network.

In this case, a memory in which the learned data recognition model is stored may also store, for example, instructions or data associated with at least one other component of the electronic device. The memory may also store software and/or a program. The program may include, for example, a kernel, a middleware, an application programming interface (API), and/or an application program (or "application").

The model evaluation unit 1310-5 may input evaluation data to the data recognition model. When a recognition result output from the evaluation data does not satisfy a predetermined criterion, the model evaluation unit 1310-5 may allow the model learning unit 1310-4 to learn again. In this case, the evaluation data may be preset data for evaluating the data recognition model.

For example, when the number or the ratio of evaluation data in which, among recognition results of a learned data recognition model for the evaluation data, a recognition result is not correct is greater than a preset threshold value, the model evaluation unit 1310-5 may estimate that the recognition result does not satisfy a predetermined criterion. For example, when the predetermined criterion is defined as a ratio of 2%, when a learned data recognition model outputs an incorrect recognition result for evaluation data exceeding 20 out of a total of 1000 evaluation data, the model evaluation unit 1310-5 may estimate that the learned data recognition model is not suitable.

In addition, the evaluation data may be derived from the user's comment input. For example, the user may input a comment message indicating satisfaction or dissatisfaction with an output recognition result. The comment input may include user feedback information on the output recognition result.

When there are a plurality of learned data recognition models, the model evaluation unit 1310-5 may estimates whether each of the learned moving picture recognition models satisfies a predetermined criterion, and may determine, as a final data recognition model, a learned data recognition model satisfying the predetermined criterion. In this case, when there are a plurality of models satisfying the predetermined criterion, the model evaluation unit 1310-5 may determine, as the final data recognition model, any one or a predetermined number of models previously set in the order of higher evaluation scores.

At least one of the data obtaining unit 1310-1, the preprocessing unit 1310-2, the learning data selection unit 1310-3, the model learning unit 1310-4, and the model evaluation unit 1310-5 in the data learning unit 1310 may be manufactured in the form of at least one hardware chip and mounted on an electronic device. For example, at least one of the data obtaining unit 1310-1, the preprocessing unit 1310-2, the learning data selection unit 1310-3, the model learning unit 1310-4, and the model evaluation unit 1310-5 may be manufactured in the form of a dedicated hardware chip for AI, or may be manufactured as a portion of a conventional general purpose processor (e.g., a CPU or an application processor) or graphics-only processor (e.g., a GPU) and mounted on various electronic devices as described above.

In addition, the data obtaining unit 1310-1, the preprocessing unit 1310-2, the learning data selection unit 1310-3, the model learning unit 1310-4, and the model evaluation unit 1310-5 may be mounted on one electronic device, or may be mounted on separate electronic devices, respectively. For example, some of the data obtaining unit 1310-1, the preprocessing unit 1310-2, the learning data selection unit 1310-3, the model learning unit 1310-4, and the model evaluation unit 1310-5 may be included in an electronic device, and the rest may be included in a server.

At least one of the data obtaining unit 1310-1, the preprocessing unit 1310-2, the learning data selection unit 1310-3, the model learning unit 1310-4, and the model evaluation unit 1310-5 may be implemented as a software module. When at least one of the data obtaining unit 1310-1, the preprocessing unit 1310-2, the learning data selection unit 1310-3, the model learning unit 1310-4, and the model evaluation unit 1310-5 is implemented as a software module (or a program module including instructions), the software module may be stored in non-transitory computer readable media. Also, in this case, at least one software module may be provided by an OS or by a predetermined application. Alternatively, a portion of the at least one software module may be provided by an OS, and the remaining portion may be provided by a predetermined application.

Figure 13:
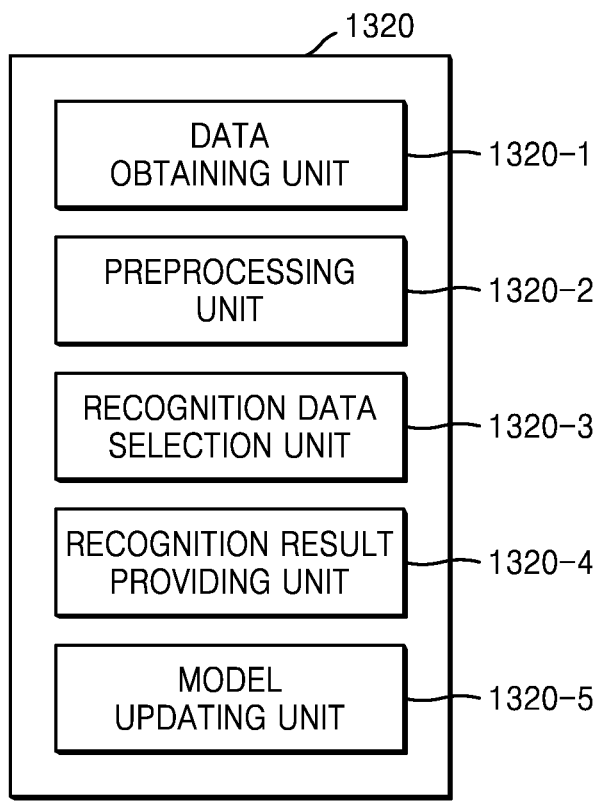
FIG. 13 is a block diagram of a data recognition unit according to an embodiment.

FIG. 13 is a block diagram of a data recognition unit 1320 according to an embodiment.

Referring to FIG. 13, the data recognition unit 1320 according to an embodiment may include a data obtaining unit 1320-1, a preprocessing unit 1320-2, a recognition data selection unit 1320-3, a recognition result providing unit 1320-4, and a model updating unit 1320-5.

The data obtaining unit 1320-1 may obtain data required to determine the intention of the user with respect to an object included in an image and to provide a response to the user's voice input, and the preprocessing unit 1320-2 may preprocess the obtained data so that the obtained data may be used to determine the intention of the user with respect to an object included in an image and provide a response to the user's voice input. The preprocessing unit 1320-2 may process the obtained data in a previously set format so that the recognition result providing unit 1320-4 to be described later may determine the intention of the user with respect to an object included in an image and provide a response to the user's voice input.

The recognition data selection unit 1320-3 may select data required to determine the intention of the user with respect to an object included in an image and provide a response to the user's voice input from among the preprocessed data. The selected data may be provided to the recognition result providing unit 1320-4. The recognition data selection unit 1320-3 may select some or all of the preprocessed data according to a previously set criterion for determining the intention of the user with respect to an object included in an image and a previously set criterion for providing a response to the user's voice input. Also, the recognition data selection unit 1320-3 may select data according to a criterion previously set by learning by the model learning unit 1310-4 which will be described later.

The recognition result providing unit 1320-4 may apply the selected data to a data recognition model to determine the intention of the user with respect to an object included in an image and provide a response to the user's voice input. The recognition result providing unit 1320-4 may provide a recognition result based on a data recognition purpose. The recognition result providing unit 1320-4 may apply the selected data to a data recognition model by using the selected data, selected by the recognition data selection unit 1320-3, as an input value. In addition, the recognition result may be determined by the data recognition model.

For example, the recognition result of a moving picture may be provided as text, voice, moving picture, image, or command (e.g., application execution command or module function execution command) The recognition result may include, for example, status information about an object included in an image, context information, and the like. The recognition result providing unit 1320-4 may provide 'This is a gift box' as the status information about an object or 'This is a gift given by A' as the context information by using text, voice, moving pictures, an image, or a command.

The model updating unit 1320-5 may update the data recognition model based on the evaluation of a recognition result provided by the recognition result providing unit 1320-4. For example, the model updating unit 1320-5 may provide the recognition result provided by the recognition result providing unit 1320-4 to the model learning unit 1310-4, and thus, the model learning unit 1310-4 may update the data recognition model.

At least one of the data obtaining unit 1320-1, the preprocessing unit 1320-2, the recognition data selection unit 1320-3, the recognition result providing unit 1320-4, and the model updating unit 1320-5 in the data recognition unit 1320 may be manufactured in the form of at least one hardware chip and mounted on an electronic device. For example, at least one of the data obtaining unit 1320-1, the preprocessing unit 1320-2, the recognition data selection unit 1320-3, the recognition result providing unit 1320-4, and the model updating unit 1320-5 may be manufactured in the form of a dedicated hardware chip for AI, or may be manufactured as a portion of a conventional general purpose processor (e.g., a CPU or an application processor) or graphics-only processor (e.g., a GPU) and mounted on various electronic devices as described above.

In addition, the data obtaining unit 1320-1, the preprocessing unit 1320-2, the recognition data selection unit 1320-3, the recognition result providing unit 1320-4, and the model updating unit 1320-5 may be mounted on one electronic device, or may be mounted on separate electronic devices, respectively. For example, some of the data obtaining unit 1320-1, the preprocessing unit 1320-2, the recognition data selection unit 1320-3, the recognition result providing unit 1320-4, and the model updating unit 1320-5 may be included in an electronic device, and the rest may be included in a server.

At least one of the data obtaining unit 1320-1, the preprocessing unit 1320-2, the recognition data selection unit 1320-3, the recognition result providing unit 1320-4, and the model updating unit 1320-5 may be implemented as a software module. When at least one of the data obtaining unit 1320-1, the preprocessing unit 1320-2, the recognition data selection unit 1320-3, the recognition result providing unit 1320-4, and the model updating unit 1320-5 is implemented as a software module (or a program module including instructions), the software module may be stored in non-transitory computer readable media. Also, in this case, at least one software module may be provided by an OS or by a predetermined application. Alternatively, a portion of the at least one software module may be provided by an OS, and the remaining portion may be provided by a predetermined application.

Figure 14:
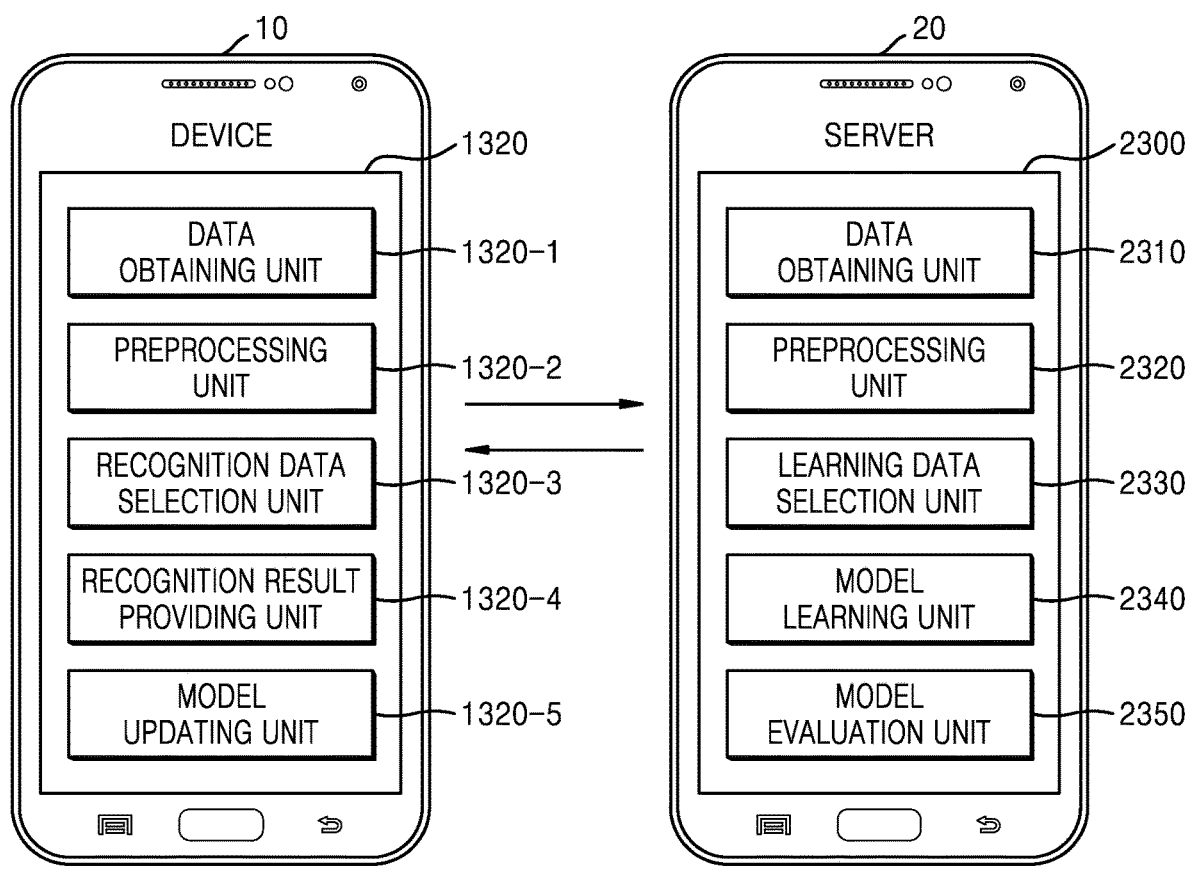
FIG. 14 illustrates an example in which a device and a server learn and recognize data by mutual interaction.

FIG. 14 illustrates an example in which a device 10 and a server 20 learn and recognize data by mutual interaction.

Referring to FIG. 14, the server 20 may learn a criterion for determining the intention of the user with respect to an object included in an image and a criterion for providing a response to the user's voice input, and based on a result of the learning by the server 20, the device 10 may determine the intention of the user with respect to an object included in an image and provide a response to the user's voice input.

In this case, a model learning unit 2340 of the server 20 may perform the function of the data learning unit 1310 shown in FIG. 11. The model learning unit 2340 of the server 20 may learn what data has to be used to determine the intention the user's intention on an object included in an image and provide a response to the user's voice input, and may learn a criterion on how to determine the intention of the user with respect to an object included in an image by using data and a criterion on how to provide a response to the user's voice input. The model learning unit 2340 may obtain data to be used for learning and apply the obtained data to a data recognition model to be described later, to thereby learn a criterion for determining the intention of the user with respect to an object included in an image and a criterion for providing a response to the user's voice input.

A recognition result providing unit 1320-4 of the device 10 may apply data selected by a recognition data selection unit 1320-3 to a data recognition model generated by the server 20 and determine the intention of the user with respect to an object included in an image and provide a response to the user's voice input. For example, the recognition result providing unit 1320-4 may transmit data selected by the recognition data selection unit 1320-3 to the server 20, and the server 20 may request the recognition result providing unit 1320-4 to apply data selected by the recognition data selection unit 1320-3 to a recognition model and to determine the intention of the user with respect to an object included in an image and provide a response to the user's voice input. In addition, the recognition result providing unit 1320-4 may receive from the server 20 the user's intention determined by the server 20 and the response to the user's voice input.

For example, the device 10 may generate data relating to an image input and a voice input and transmit the data to the server 20. In addition, the device 10 may receive, from the server 20, information about the intention of the user with respect to an object included in an image and a response to the user's voice input.

Alternatively, the recognition result providing unit 1320-4 of the device 10 may receive a recognition model generated by the server 20 from the server 20 and may use the received recognition model to determine the intention of the user with respect to an object included in an image and provide a response to the user's voice input. In this case, the recognition result providing unit 1320-4 of the device 10 may apply data selected by the recognition data selection unit 1320-3 to a data recognition model received from the server 20 and determine the intention of the user with respect to an object included in an image and provide a response to the user's voice input.

One exemplary embodiment may be embodied in the form of a computer-readable recording medium storing an instruction which is executable by a computer, such as a computer-executable program module. The computer-readable recording medium may be any available medium accessible by a computer, and examples thereof include a volatile recording medium, a nonvolatile recording medium, a separable storing medium, and a non-separable recording medium. Examples of the computer-readable recording medium may further include a computer storage medium and a communication medium. Examples of the computer-readable recording medium may include a volatile recording medium, a nonvolatile recording medium, a separable recording medium and a non-separable recording medium manufactured according to any method or technology to store information such as computer-readable instructions, data structures, program modules, or other data. Generally, examples of the communication medium include a computer-readable instruction, a data structure, a program module, or other data of a modified data signal, other transmission mechanisms, or any information transfer medium.

In the present disclosure, the term "interface" may be understood to mean a hardware component such as a processor or a circuit and/or a software component executable by a hardware component such as a processor.

The exemplary embodiments set forth herein are intended to provide examples and it will be apparent to those of ordinary skill in the art that various changes may be made in the exemplary embodiments without departing from the technical idea and indispensable features of the inventive concept. Therefore, the exemplary embodiments set forth herein should be considered in descriptive sense only and not for purposes of limitation. For example, components described herein as being combined with each other may be embodied separately from each other, and similarly, components described herein as being separated from each other may be embodied to be combined with each other.

Therefore, the scope of the inventive concept should be defined by the appended claims other than the detailed description, and all differences derived from the meaning and scope of the claims and concepts equivalent thereto thereof will be construed as falling within the scope of the inventive concept.

The invention claimed is:

1. A method of providing a response message to a user of a device, the method comprising:
   capturing, via a camera of the device, an image including at least one object;
   activating a microphone of the device while the image is being captured;
   receiving, via the microphone, a user's voice input indicating a question about an object in the image;
   identifying the object corresponding to the received user's voice input from among the at least one object in the image, based on the image and the user's voice input;
   determining an intention of the user with respect to the identified object by analyzing the received user's voice input;
   determining a type of a language used by the user by analyzing the user's voice input;
   determining a background knowledge level of the user corresponding to the determined type of the language; and
   providing a response regarding the identified object, based on the determined intention of the user, the determined background knowledge level of the user and the identified object, by using the determined type of the language.

2. The method of claim 1, further comprising
obtaining at least one of user intonation information and user emotion information by generating user intonation information of the user by analyzing at least one of a voice energy (dB), a sound pitch (Hz), a shimmer of a voice waveform, and a change rate (zitter) of a vocal fold vibration,
wherein the determining of the intention of the user comprises determining the intention of the user with respect to the identified object by using the generated intonation information.

3. The method of claim 2,
wherein the obtaining at least one of user intonation information and user emotion information comprises generating emotion information of the user by analyzing the generated intonation information, and
wherein the determining of the intention of the user comprises determining the intention of the user with respect to the identified object based on the generated intonation information and the generated emotion information.

4. The method of claim 1,
wherein the identifying of the object comprises identifying the object by selecting a target of the user's voice input, based on the determined type of the language, and
wherein the providing of the response regarding the identified object comprises providing a response regarding the selected object by using the determined type of the language.

5. The method of claim 1, further comprising:
extracting text data included in the received user's voice input,
wherein the providing of the response regarding the identified object comprises providing a response regarding the identified object, based on the extracted text data and the intention of the user.

6. The method of claim 1, wherein the providing of the response regarding the identified object comprises:
generating a search word based on the intention of the user; and
providing a search result obtained by performing a search using the search word together with the response regarding the identified object.

7. The method of claim 1, further comprising:
displaying the image including the at least one object,
wherein the activating the microphone of the device comprises activating the microphone of the device while the image is displayed.

8. The method of claim 7, further comprising receiving the user's input for selecting a portion of the image that is displayed,
wherein the identifying of the object comprises identifying the object in the selected portion.

9. A device for providing a response to a user's voice input, the device comprising:
an input unit configured to receive an image including at least one object captured through a camera of the device and receive the user's voice input for the object inputted through a microphone of the device, wherein the user's voice input indicating a question about an object in the image;
a memory storing at least one instruction; and
at least one processor configured to execute the at least one instruction stored in the memory,
wherein the at least one processor is further configured to execute the at least one instruction to:

activate the microphone of the device while the image is being captured, identify the object corresponding to the received user's voice input from among the at least one object in the image, based on the image and the user's voice input, determine an intention of the user with respect to the identified object by analyzing the received user's voice input, determine a type of a language used by the user by analyzing the user's voice input, determine a background knowledge level of the user corresponding to the determined type of the language, and provide a response regarding the identified object based on the determined intention of the user, the determined background knowledge level of the user, and the identified object, by using the determined type of the language.

10. The device of claim 9, wherein the at least one processor is further configured to execute the at least one instruction to:

generate intonation information of the user by analyzing at least one of a voice energy (dB), a sound pitch (Hz), a shimmer of a voice waveform, and a change rate (zitter) of a vocal fold vibration, and determine the intention of the user with respect to the identified object by using the generated intonation information.

11. The device of claim 10, wherein the at least one processor is further configured to execute the at least one instruction to:

generate emotion information of the user by analyzing the generated intonation information, and determine the intention of the user with respect to the identified object, based on the generated intonation information and the generated emotion information.

12. The device of claim 9, wherein the at least one processor is further configured to execute the at least one instruction to:

identify the object by selecting a target of the user's voice input, based on the determined type of the language, and provide a response regarding the selected object by using the determined type of the language.

13. The device of claim 9, wherein the at least one processor is further configured to execute the at least one instruction to:

extract text data included in the received user's voice input, and provide a response regarding the identified object based on the extracted text data and the intention of the user.

14. The device of claim 9, wherein the at least one processor is further configured to execute the at least one instruction to:

generate a search word based on the intention of the user, and provide a search result obtained by performing a search using the search word together with the response regarding the identified object.

15. The device of claim 9, further comprising:

a display displaying the image including the at least one object, wherein the at least one processor is further configured to execute the at least one instruction to activate the microphone of the device while the image is displayed.

16. The device of claim 15, wherein the at least one processor is further configured to execute the at least one instruction to:

receive the user's input for selecting a portion of the image that is displayed, and identify the object in the selected portion.

17. A non-transitory computer-readable recording medium having recorded thereon a program for executing the method of claim 1 on a computer.

* * * * *